US012700634B2

(12) United States Patent (10) Patent No.: US 12,700,634 B2
Ota et al. (45) Date of Patent: Aug. 4, 2026

(54) ELECTROCHEMICAL CELL MODULES AND METHODS OF PRODUCING THE SAME

(71) Applicant: 24M Technologies, Inc., Cambridge, MA (US)

(72) Inventors: Naoki Ota, Lexington, MA (US); Junzheng Chen, Concord, MA (US); Raymond Zagars, Quincy, MA (US); Jeffry Disko, Lexington, MA (US); Ryan Michael Lawrence, Cambridge, MA (US)

(73) Assignee: 24M Technologies, Inc.

( * ) Notice: Subject to any disclaimer, the term of this patent is extended or adjusted under 35 U.S.C. 154(b) by 806 days.

(21) Appl. No.: 17/975,115

(22) Filed: Oct. 27, 2022

(65) Prior Publication Data

US 2023/0133464 A1     May 4, 2023

Related U.S. Application Data

(60) Provisional application No. 63/272,755, filed on Oct. 28, 2021.

(51) Int. Cl.
H01M 10/48 (2006.01)
H01M 10/647 (2014.01)
(Continued)

(52) U.S. Cl.
CPC ....... H01M 50/211 (2021.01); H01M 10/482 (2013.01); H01M 10/486 (2013.01);
(Continued)

(58) Field of Classification Search
CPC ............. H01M 50/211; H01M 10/482; H01M 10/486; H01M 10/647; H01M 10/6551;
(Continued)

(56) References Cited

U.S. PATENT DOCUMENTS 2,208,028 A     7/1940   Harrington
3,624,628 A    11/1971   Schmidt
(Continued)

FOREIGN PATENT DOCUMENTS

CA          2876416 A1    12/2013
CA          2895142 A1     6/2014
(Continued)

OTHER PUBLICATIONS

International Search Report and Written Opinion for Application No. PCT/US2022/048085, mailed Feb. 16, 2023, 16 pages.
(Continued)

*Primary Examiner* — Lisa S Park
(74) *Attorney, Agent, or Firm* — Cooley LLP

(57) ABSTRACT

Embodiments described herein include electrochemical cell modules. In some aspects, an electrochemical cell module includes a first electrochemical cell and a second electrochemical cell. The first electrochemical cell includes an anode material disposed on an anode current collector, a cathode material disposed on a cathode current collector, a separator disposed between the anode material and the cathode material, and a pouch material disposed on the anode current collector and the cathode current collector. The separator extends beyond the anode material and the cathode material and the pouch material extends beyond the separator. The portion of the separator that extends beyond the outer edge of the anode material and the cathode material and the portion of the pouch material that extends beyond the outer edge of the separator are folded at an angle of about 80 degrees to about 110 degrees with respect to the anode material and the cathode material.

23 Claims, 22 Drawing Sheets

(51) Int. Cl.

| | |
|---|---|
| *H01M 10/6551* | (2014.01) |
| *H01M 50/105* | (2021.01) |
| *H01M 50/211* | (2021.01) |
| *H01M 50/30* | (2021.01) |
| *H01M 50/46* | (2021.01) |
| *H01M 50/466* | (2021.01) |

(52) U.S. Cl.
CPC ..... *H01M 10/647* (2015.04); *H01M 10/6551* (2015.04); *H01M 50/105* (2021.01); *H01M 50/394* (2021.01); *H01M 50/46* (2021.01); *H01M 50/466* (2021.01)

(58) Field of Classification Search
CPC .. H01M 50/105; H01M 50/394; H01M 50/46; H01M 50/466; H01M 10/0481; H01M 10/613; H01M 10/653; H01M 10/6555; H01M 50/224; H01M 50/238; H01M 50/317; Y02E 60/10; Y02P 70/50
See application file for complete search history.

(56) References Cited

U.S. PATENT DOCUMENTS

| | | | |
|---|---|---|---|
| 3,982,966 | A | 9/1976 | Beatty et al. |
| 4,080,728 | A | 3/1978 | Buckler |
| 4,092,464 | A | 5/1978 | Dey et al. |
| 4,105,815 | A | 8/1978 | Buckler |
| 4,199,912 | A | 4/1980 | James, Jr. et al. |
| 4,386,019 | A | 5/1983 | Kaun et al. |
| 4,576,878 | A | 3/1986 | Gahn |
| 4,623,598 | A | 11/1986 | Waki et al. |
| 4,695,355 | A | 9/1987 | Koziol |
| 4,788,112 | A | 11/1988 | Kung |
| 4,818,643 | A | 4/1989 | Cook et al. |
| 4,925,752 | A | 5/1990 | Fauteux et al. |
| 5,316,556 | A | 5/1994 | Morris |
| 5,582,931 | A | 12/1996 | Kawakami |
| 5,603,770 | A | 2/1997 | Sato |
| 5,612,152 | A | 3/1997 | Bates |
| 5,674,556 | A | 10/1997 | Fukumura et al. |
| 5,697,145 | A | 12/1997 | Fukumura et al. |
| 5,725,822 | A | 3/1998 | Keller et al. |
| 5,749,927 | A | 5/1998 | Chern et al. |
| 5,792,576 | A | 8/1998 | Xing et al. |
| 5,814,420 | A | 9/1998 | Chu |
| 5,834,052 | A | 11/1998 | Fukumura et al. |
| 5,837,397 | A | 11/1998 | Xing |
| 6,060,864 | A | 5/2000 | Ito et al. |
| 6,207,322 | B1 | 3/2001 | Kelsey et al. |
| 6,264,707 | B1 | 7/2001 | Ishikawa et al. |
| 6,284,192 | B1 | 9/2001 | Coonan et al. |
| 6,287,722 | B1 | 9/2001 | Barton et al. |
| 6,291,091 | B1 | 9/2001 | Preischl et al. |
| 6,296,967 | B1 | 10/2001 | Jacobs et al. |
| 6,296,971 | B1 | 10/2001 | Hara |
| 6,306,215 | B1 | 10/2001 | Larkin |
| 6,368,365 | B1 | 4/2002 | Chi et al. |
| 6,403,262 | B1 | 6/2002 | Xing et al. |
| 6,461,757 | B1 | 10/2002 | Sasayama et al. |
| 6,503,432 | B1 | 1/2003 | Barton et al. |
| 6,503,657 | B1 | 1/2003 | Takami et al. |
| 6,576,365 | B1 | 6/2003 | Meitav et al. |
| 6,582,480 | B2 | 6/2003 | Pasquier et al. |
| 6,589,299 | B2 | 7/2003 | Missling et al. |
| 6,709,785 | B2 | 3/2004 | Lee et al. |
| 6,803,145 | B1 | 10/2004 | Von During |
| 6,939,383 | B2 | 9/2005 | Eastin et al. |
| 6,986,967 | B2 | 1/2006 | Barton et al. |
| 7,002,265 | B2 | 2/2006 | Potega |
| 7,022,391 | B2 | 4/2006 | Kawai et al. |
| 7,041,380 | B2 | 5/2006 | Yamashita et al. |
| 7,338,734 | B2 | 3/2008 | Chiang et al. |
| 7,524,577 | B2 | 4/2009 | Bates |
| 7,700,019 | B2 | 4/2010 | Lavoie et al. |

| | | | |
|---|---|---|---|
| 7,734,317 | B2 | 6/2010 | Patel et al. |
| 7,846,575 | B2 | 12/2010 | Heller, Jr. et al. |
| 8,722,226 | B2 | 5/2014 | Chiang et al. |
| 8,722,227 | B2 | 5/2014 | Chiang et al. |
| 8,778,552 | B2 | 7/2014 | Chiang et al. |
| 8,790,801 | B2 | 7/2014 | Reynolds |
| 8,993,159 | B2 | 3/2015 | Chiang et al. |
| 9,153,833 | B2 | 10/2015 | Chiang et al. |
| 9,178,200 | B2 | 11/2015 | Bazzarella et al. |
| 9,184,464 | B2 | 11/2015 | Chiang et al. |
| 9,203,092 | B2 | 12/2015 | Slocum et al. |
| 9,293,781 | B2 | 3/2016 | Chiang et al. |
| 9,362,583 | B2 | 6/2016 | Chiang et al. |
| 9,368,773 | B2 | 6/2016 | Gendlin et al. |
| 9,385,392 | B2 | 7/2016 | Chiang et al. |
| 9,401,501 | B2 | 7/2016 | Bazzarella et al. |
| 9,437,864 | B2 | 9/2016 | Tan et al. |
| 9,450,275 | B2 | 9/2016 | Obasih et al. |
| 9,484,569 | B2 | 11/2016 | Doherty et al. |
| 9,509,176 | B2 | 11/2016 | Carter et al. |
| 9,583,780 | B2 | 2/2017 | Chiang et al. |
| 9,614,231 | B2 | 4/2017 | Carter et al. |
| 9,786,944 | B2 | 10/2017 | Chiang et al. |
| 9,812,674 | B2 | 11/2017 | Bazzarella et al. |
| 9,825,280 | B2 | 11/2017 | Chiang et al. |
| 9,831,518 | B2 | 11/2017 | Chiang et al. |
| 9,831,519 | B2 | 11/2017 | Chiang et al. |
| 9,831,522 | B2 | 11/2017 | Tan et al. |
| 10,115,970 | B2 | 10/2018 | Ota et al. |
| 10,122,044 | B2 | 11/2018 | Tan et al. |
| 10,153,651 | B2 | 12/2018 | Taylor et al. |
| 10,181,587 | B2 | 1/2019 | Ota et al. |
| 10,230,128 | B2 | 3/2019 | Chiang et al. |
| 10,236,518 | B2 | 3/2019 | Chiang et al. |
| 10,411,310 | B2 | 9/2019 | Chiang et al. |
| 10,483,582 | B2 | 11/2019 | Chiang et al. |
| 10,497,935 | B2 | 12/2019 | Ota et al. |
| 10,522,870 | B2 | 12/2019 | Tan et al. |
| 10,566,581 | B2 | 2/2020 | Bazzarella et al. |
| 10,566,603 | B2 | 2/2020 | Slocum et al. |
| 10,586,999 | B2 | 3/2020 | Locke et al. |
| 10,593,952 | B2 | 3/2020 | Ota et al. |
| 10,601,239 | B2 | 3/2020 | Taylor et al. |
| 10,637,038 | B2 | 4/2020 | Zagars et al. |
| 10,734,672 | B2 | 8/2020 | Chen et al. |
| 10,777,852 | B2 | 9/2020 | Woodford et al. |
| 10,854,869 | B2 | 12/2020 | Bazzarella et al. |
| 10,886,521 | B2 | 1/2021 | Zagars et al. |
| 10,910,858 | B2 | 2/2021 | Taylor et al. |
| 10,957,940 | B2 | 3/2021 | Tan et al. |
| 10,964,973 | B2 | 3/2021 | Tan et al. |
| 11,005,087 | B2 | 5/2021 | Ota et al. |
| 11,018,365 | B2 | 5/2021 | Chiang et al. |
| 11,024,903 | B2 | 6/2021 | Ota et al. |
| 11,094,487 | B2 | 8/2021 | Lawrence et al. |
| 11,094,976 | B2 | 8/2021 | Chiang et al. |
| 11,108,107 | B2 | 8/2021 | Kim et al. |
| 11,121,437 | B2 | 9/2021 | Bazzarella et al. |
| 11,139,467 | B2 | 10/2021 | Zagars et al. |
| 11,145,909 | B2 | 10/2021 | Chiang et al. |
| 11,309,531 | B2 | 4/2022 | Slocum et al. |
| 11,342,567 | B2 | 5/2022 | Chiang et al. |
| 11,394,049 | B2 | 7/2022 | Tan et al. |
| 11,462,722 | B2 | 10/2022 | Aranami et al. |
| 11,469,065 | B2 | 10/2022 | Lawrence et al. |
| 11,476,551 | B2 | 10/2022 | Tyler et al. |
| 11,552,368 | B2 | 1/2023 | Holman et al. |
| 11,575,146 | B2 | 2/2023 | Taylor et al. |
| 11,594,793 | B2 | 2/2023 | Bazzarella et al. |
| 11,611,061 | B2 | 3/2023 | Zagars et al. |
| 11,631,920 | B2 | 4/2023 | Bazzarella et al. |
| 11,646,437 | B2 | 5/2023 | Bazzarella et al. |
| 11,652,203 | B2 | 5/2023 | Zagars et al. |
| 11,742,525 | B2 | 8/2023 | Aranami et al. |
| 11,749,804 | B2 | 9/2023 | Chen et al. |
| 11,757,129 | B2 | 9/2023 | Tan et al. |
| 11,764,353 | B2 | 9/2023 | Ota et al. |
| 11,804,595 | B2 | 10/2023 | Ota et al. |
| 11,811,119 | B2 | 11/2023 | Chiang et al. |

(56)  References Cited

U.S. PATENT DOCUMENTS

| | | |
|---|---|---|
| 11,831,026 B2 | 11/2023 | Ota et al. |
| 11,855,250 B2 | 12/2023 | Taylor et al. |
| 11,876,194 B2 | 1/2024 | Chiang et al. |
| 11,888,144 B2 | 1/2024 | Slocum et al. |
| 11,909,077 B2 | 2/2024 | Chiang et al. |
| 11,942,654 B2 | 3/2024 | Bazzarella et al. |
| 11,961,990 B2 | 4/2024 | Ota et al. |
| 12,009,551 B2 | 6/2024 | Bazzarella et al. |
| 12,068,445 B2 | 8/2024 | Bazzarella et al. |
| 12,068,486 B2 | 8/2024 | Lawrence et al. |
| 12,095,025 B2 | 9/2024 | Tan et al. |
| 12,107,211 B2 | 10/2024 | Chen et al. |
| 12,107,252 B2 | 10/2024 | Aranami et al. |
| 12,125,984 B2 | 10/2024 | Zagars et al. |
| 12,142,721 B2 | 11/2024 | Taylor |
| 12,176,519 B2 | 12/2024 | Zagars et al. |
| 12,183,909 B2 | 12/2024 | Zagars et al. |
| 12,199,240 B2 | 1/2025 | Tan et al. |
| 12,272,818 B2 | 4/2025 | Ota et al. |
| 12,322,832 B2 | 6/2025 | Carlson et al. |
| 12,347,874 B2 | 7/2025 | Ota et al. |
| 12,362,395 B2 | 7/2025 | Chen et al. |
| 12,362,398 B2 | 7/2025 | Aranami et al. |
| 12,368,157 B2 | 7/2025 | Doherty et al. |
| 12,381,277 B2 | 8/2025 | Chen et al. |
| 12,401,088 B2 | 8/2025 | Chen |
| 12,401,089 B2 | 8/2025 | Chen |
| 12,407,065 B2 | 9/2025 | Chen |
| 12,407,073 B2 | 9/2025 | Tyler et al. |
| 12,456,780 B2 | 10/2025 | Chen et al. |
| 12,469,927 B2 | 11/2025 | Bazzarella et al. |
| 2001/0000423 A1 | 4/2001 | Fischer et al. |
| 2001/0012588 A1 | 8/2001 | Kaido et al. |
| 2001/0021471 A1 | 9/2001 | Xing et al. |
| 2002/0022180 A1 | 2/2002 | Olsen et al. |
| 2002/0106561 A1 | 8/2002 | Lee et al. |
| 2003/0071337 A1 | 4/2003 | Mitani et al. |
| 2003/0116556 A1 | 6/2003 | Li |
| 2003/0116881 A1 | 6/2003 | Nelson et al. |
| 2003/0205835 A1 | 11/2003 | Eastin et al. |
| 2004/0029001 A1 | 2/2004 | Yamazaki et al. |
| 2004/0029008 A1 | 2/2004 | Winterberg et al. |
| 2004/0029311 A1 | 2/2004 | Snyder et al. |
| 2004/0131934 A1 | 7/2004 | Sugnaux et al. |
| 2004/0264110 A1 | 12/2004 | Michel et al. |
| 2005/0035741 A1 | 2/2005 | Elder et al. |
| 2005/0037262 A1 | 2/2005 | Vallee et al. |
| 2005/0064270 A1 | 3/2005 | Marianowski |
| 2005/0123815 A1 | 6/2005 | Tsai et al. |
| 2005/0214648 A1 | 9/2005 | Boulton et al. |
| 2006/0046137 A1 | 3/2006 | Kodama |
| 2006/0057433 A1 | 3/2006 | Ando et al. |
| 2006/0152224 A1 | 7/2006 | Kim et al. |
| 2006/0267545 A1 | 11/2006 | Lee et al. |
| 2007/0034251 A1 | 2/2007 | Jonczyk et al. |
| 2008/0096110 A1 | 4/2008 | Bito et al. |
| 2008/0289676 A1 | 11/2008 | Guidotti et al. |
| 2008/0299451 A1 | 12/2008 | Funahashi et al. |
| 2009/0023041 A1 | 1/2009 | Cooper |
| 2009/0029259 A1 | 1/2009 | Okazaki et al. |
| 2009/0115252 A1 | 5/2009 | Caraghiorghiopol et al. |
| 2009/0186270 A1 | 7/2009 | Harada et al. |
| 2010/0040942 A1 | 2/2010 | Hatta et al. |
| 2010/0047671 A1 | 2/2010 | Chiang et al. |
| 2010/0060231 A1 | 3/2010 | Trainor et al. |
| 2010/0097033 A1 | 4/2010 | Tange |
| 2010/0104817 A1 | 4/2010 | Carlson |
| 2010/0112454 A1 | 5/2010 | Visco et al. |
| 2010/0164437 A1 | 7/2010 | McKinley et al. |
| 2010/0190081 A1 | 7/2010 | Park et al. |
| 2010/0196800 A1 | 8/2010 | Markoski et al. |
| 2010/0248026 A1 | 9/2010 | Hinoki et al. |
| 2010/0323264 A1 | 12/2010 | Chiang et al. |
| 2011/0086258 A1 | 4/2011 | Yaginuma et al. |
| 2011/0104527 A1 | 5/2011 | Choi et al. |
| 2011/0123855 A1 | 5/2011 | Kim et al. |
| 2011/0129722 A1 | 6/2011 | Yoneda |
| 2011/0183169 A1 | 7/2011 | Bhardwaj et al. |
| 2011/0189520 A1 | 8/2011 | Carter et al. |
| 2011/0200848 A1 | 8/2011 | Chiang et al. |
| 2011/0228385 A1 | 9/2011 | Avison et al. |
| 2011/0274948 A1 | 11/2011 | Duduta et al. |
| 2011/0287314 A1 | 11/2011 | Jung |
| 2011/0300440 A1 | 12/2011 | Matsuda et al. |
| 2011/0311857 A1 | 12/2011 | Tucholski |
| 2012/0003547 A1 | 1/2012 | Raj |
| 2012/0050848 A1 | 3/2012 | Carlson et al. |
| 2012/0058378 A1 | 3/2012 | Lee et al. |
| 2012/0069429 A1 | 3/2012 | Barrett et al. |
| 2012/0070715 A1 | 3/2012 | Obika |
| 2012/0121963 A1 | 5/2012 | Kwon et al. |
| 2012/0135257 A1 | 5/2012 | Carlson et al. |
| 2012/0164499 A1 | 6/2012 | Chiang et al. |
| 2012/0177981 A1 | 7/2012 | Kim |
| 2012/0315537 A1 | 12/2012 | Ravdel et al. |
| 2013/0000110 A1 | 1/2013 | Takeda et al. |
| 2013/0029205 A1 | 1/2013 | Adams et al. |
| 2013/0029206 A1 | 1/2013 | Lev |
| 2013/0055559 A1 | 3/2013 | Slocum et al. |
| 2013/0065122 A1 | 3/2013 | Chiang et al. |
| 2013/0071696 A1 | 3/2013 | Kim et al. |
| 2013/0131744 A1 | 5/2013 | Viavattine |
| 2013/0230641 A1 | 9/2013 | Suzuki |
| 2013/0236766 A1 | 9/2013 | Seo et al. |
| 2013/0309547 A1 | 11/2013 | Bazzarella et al. |
| 2013/0320768 A1 | 12/2013 | Fujimatsu et al. |
| 2013/0337319 A1 | 12/2013 | Doherty et al. |
| 2013/0344367 A1 | 12/2013 | Chiang et al. |
| 2014/0004437 A1 | 1/2014 | Slocum et al. |
| 2014/0008006 A1 | 1/2014 | Lee et al. |
| 2014/0030623 A1 | 1/2014 | Chiang et al. |
| 2014/0039710 A1 | 2/2014 | Carter et al. |
| 2014/0079992 A1 | 3/2014 | Tanaka |
| 2014/0125270 A1 | 5/2014 | Luo et al. |
| 2014/0131630 A1 | 5/2014 | Hwang et al. |
| 2014/0154546 A1 | 6/2014 | Carter et al. |
| 2014/0154565 A1 | 6/2014 | Ku et al. |
| 2014/0170524 A1 | 6/2014 | Chiang et al. |
| 2014/0248521 A1 | 9/2014 | Chiang et al. |
| 2014/0255762 A1 | 9/2014 | Lee et al. |
| 2014/0272547 A1 | 9/2014 | Ramasubramanian et al. |
| 2014/0315097 A1 | 10/2014 | Tan et al. |
| 2014/0318746 A1* | 10/2014 | Kwak ............... H01M 10/6557 165/185 |
| 2014/0356736 A1 | 12/2014 | Choi et al. |
| 2014/0363721 A1 | 12/2014 | Bhola et al. |
| 2015/0024279 A1 | 1/2015 | Tan et al. |
| 2015/0027615 A1 | 1/2015 | Singh et al. |
| 2015/0129081 A1 | 5/2015 | Chiang et al. |
| 2015/0140371 A1 | 5/2015 | Slocum |
| 2015/0155596 A1 | 6/2015 | Gardner |
| 2015/0171406 A1 | 6/2015 | Bazzarella et al. |
| 2015/0280267 A1 | 10/2015 | Chiang et al. |
| 2015/0295272 A1 | 10/2015 | Chiang et al. |
| 2015/0357626 A1 | 12/2015 | Holman et al. |
| 2016/0013507 A1 | 1/2016 | Chiang et al. |
| 2016/0031791 A1 | 2/2016 | Clark et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0190544 A1 | 6/2016 | Slocum et al. |
| 2016/0218375 A1 | 7/2016 | Chiang et al. |
| 2016/0226053 A1 | 8/2016 | Wu et al. |
| 2016/0268621 A1 | 9/2016 | Chiang et al. |
| 2016/0301038 A1 | 10/2016 | Modest et al. |
| 2016/0308218 A1 | 10/2016 | Ota et al. |
| 2016/0344006 A1 | 11/2016 | Ota et al. |
| 2016/0365544 A1 | 12/2016 | Lee et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |

(56) References Cited

U.S. PATENT DOCUMENTS

| | | |
|---|---|---|
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0098857 A1 | 4/2017 | Carlson et al. |
| 2017/0162863 A1 | 6/2017 | Doherty et al. |
| 2017/0214031 A1 | 7/2017 | Lee et al. |
| 2017/0214034 A1 | 7/2017 | Ota et al. |
| 2017/0237111 A1 | 8/2017 | Holman et al. |
| 2017/0237112 A1 | 8/2017 | Holman et al. |
| 2017/0288281 A1 | 10/2017 | Chiang et al. |
| 2018/0034090 A1 | 2/2018 | Chiang et al. |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |
| 2019/0245242 A1 | 8/2019 | Tan et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0359065 A1 | 11/2019 | Al-Awami et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0106094 A1 | 4/2020 | Ota et al. |
| 2020/0127337 A1 | 4/2020 | Kim et al. |
| 2020/0161688 A1 | 5/2020 | Chiang et al. |
| 2020/0220118 A1 | 7/2020 | Bazzarella et al. |
| 2020/0220204 A1 | 7/2020 | Tan et al. |
| 2020/0259338 A1 | 8/2020 | Taylor et al. |
| 2020/0321597 A1 | 10/2020 | Zagars et al. |
| 2020/0321601 A1 | 10/2020 | Slocum et al. |
| 2020/0358129 A1 | 11/2020 | Chen et al. |
| 2020/0365858 A1 | 11/2020 | Jaspers et al. |
| 2020/0395583 A1 | 12/2020 | Carlson et al. |
| 2020/0411825 A1 | 12/2020 | Bazzarella et al. |
| 2021/0083277 A1 | 3/2021 | Yamashita et al. |
| 2021/0091366 A1 | 3/2021 | Bazzarella et al. |
| 2021/0167351 A1 | 6/2021 | Zagars et al. |
| 2021/0226192 A1 | 7/2021 | Aranami et al. |
| 2021/0249678 A1 | 8/2021 | Chiang et al. |
| 2021/0249695 A1 | 8/2021 | Aranami et al. |
| 2021/0249696 A1 | 8/2021 | Maniwa et al. |
| 2021/0265631 A1 | 8/2021 | Chen et al. |
| 2021/0296733 A1 | 9/2021 | Carlson et al. |
| 2021/0344035 A1 | 11/2021 | He et al. |
| 2021/0344037 A1 | 11/2021 | He et al. |
| 2021/0359527 A1 | 11/2021 | Taylor et al. |
| 2021/0376380 A1 | 12/2021 | Tan et al. |
| 2021/0384516 A1 | 12/2021 | Lawrence et al. |
| 2022/0021019 A1 | 1/2022 | Tan et al. |
| 2022/0029207 A1 | 1/2022 | Chiang et al. |
| 2022/0037749 A1 | 2/2022 | Bazzarella et al. |
| 2022/0052403 A1 | 2/2022 | Chen et al. |
| 2022/0077445 A1 | 3/2022 | Ota et al. |
| 2022/0085440 A1 | 3/2022 | Ota et al. |
| 2022/0093929 A1 | 3/2022 | Chen et al. |
| 2022/0115710 A1 | 4/2022 | Zagars et al. |
| 2022/0172916 A1 | 6/2022 | Lawrence et al. |
| 2022/0173446 A1 | 6/2022 | Chiang et al. |
| 2022/0200306 A1 | 6/2022 | Kusachi et al. |
| 2022/0209220 A1 | 6/2022 | Lee et al. |
| 2022/0231274 A1 | 7/2022 | Zagars et al. |
| 2022/0238923 A1 | 7/2022 | Chen et al. |
| 2022/0263104 A1 | 8/2022 | Chiang et al. |
| 2022/0263193 A1 | 8/2022 | Chen et al. |
| 2022/0278427 A1 | 9/2022 | Lawrence et al. |
| 2022/0285669 A1 | 9/2022 | Doherty et al. |
| 2022/0344775 A1 | 10/2022 | Carlson et al. |
| 2022/0344776 A1 | 10/2022 | Carlson |
| 2022/0352597 A1 | 11/2022 | Chen et al. |
| 2022/0352598 A1 | 11/2022 | Avison et al. |
| 2023/0018078 A1 | 1/2023 | Slocum et al. |
| 2023/0022329 A1 | 1/2023 | Chen et al. |
| 2023/0085181 A1 | 3/2023 | Tan et al. |
| 2023/0090853 A1 | 3/2023 | Tyler et al. |
| 2023/0098274 A1 | 3/2023 | Carlson et al. |
| 2023/0118961 A1 | 4/2023 | Chen et al. |
| 2023/0136385 A1* | 5/2023 | Jeong .................. H01M 10/045 |
| | | 100/299 |
| 2023/0170169 A1 | 6/2023 | Lawrence et al. |
| 2023/0178707 A1 | 6/2023 | Aranami et al. |
| 2023/0291063 A1 | 9/2023 | Holman et al. |
| 2023/0307803 A1 | 9/2023 | Bazzarella et al. |
| 2023/0327077 A1 | 10/2023 | Zagars et al. |
| 2023/0327178 A1 | 10/2023 | Taylor et al. |
| 2023/0335748 A1 | 10/2023 | Chen et al. |
| 2023/0369719 A1 | 11/2023 | Bazzarella et al. |
| 2023/0378512 A1 | 11/2023 | Bazzarella et al. |
| 2023/0395771 A1 | 12/2023 | Zagars et al. |
| 2024/0039001 A1 | 2/2024 | Kusachi et al. |
| 2024/0039088 A1* | 2/2024 | Oh ........................ B32B 27/304 |
| 2024/0039120 A1 | 2/2024 | Carlson |
| 2024/0055702 A1 | 2/2024 | Ota et al. |
| 2024/0063417 A1 | 2/2024 | Chiang et al. |
| 2024/0079647 A1 | 3/2024 | Tan et al. |
| 2024/0088355 A1 | 3/2024 | Ota et al. |
| 2024/0106003 A1 | 3/2024 | Aranami et al. |
| 2024/0234705 A1 | 7/2024 | Ota et al. |
| 2024/0274855 A1 | 8/2024 | Chiang et al. |
| 2024/0274864 A1 | 8/2024 | Taylor et al. |
| 2024/0347799 A1 | 10/2024 | Chiang |
| 2024/0372212 A1 | 11/2024 | Chen et al. |
| 2024/0372213 A1 | 11/2024 | Chen et al. |
| 2024/0372214 A1 | 11/2024 | Chen et al. |
| 2024/0405391 A1 | 12/2024 | Bazzarella |
| 2024/0413482 A1 | 12/2024 | Bazzarella et al. |
| 2024/0429399 A1 | 12/2024 | Lawrence et al. |
| 2024/0429429 A1 | 12/2024 | Bazzarella et al. |
| 2025/0023009 A1 | 1/2025 | Ota et al. |
| 2025/0046860 A1 | 2/2025 | Chen et al. |
| 2025/0054939 A1 | 2/2025 | Aranami |
| 2025/0070261 A1 | 2/2025 | Zagars |
| 2025/0105337 A1 | 3/2025 | Taylor et al. |
| 2025/0105449 A1 | 3/2025 | Carlson et al. |
| 2025/0183262 A1 | 6/2025 | Zagars et al. |
| 2025/0279467 A1 | 9/2025 | Tan |
| 2025/0364645 A1 | 11/2025 | Chen et al. |
| 2025/0372814 A1 | 12/2025 | Chen et al. |
| 2025/0372831 A1 | 12/2025 | Aranami et al. |
| 2025/0385346 A1 | 12/2025 | Ota et al. |
| 2026/0005319 A1 | 1/2026 | Chen et al. |

FOREIGN PATENT DOCUMENTS

| | | |
|---|---|---|
| CN | 1333929 A | 1/2002 |
| CN | 1354529 A | 6/2002 |
| CN | 1791999 A | 6/2006 |
| CN | 1883075 A | 12/2006 |
| CN | 101171703 A | 4/2008 |
| CN | 101212070 A | 7/2008 |
| CN | 101669231 A | 3/2010 |
| CN | 101796654 A | 8/2010 |
| CN | 102089921 A | 6/2011 |
| CN | 102549808 A | 7/2012 |
| CN | 102593500 A | 7/2012 |
| CN | 102983369 A | 3/2013 |
| CN | 103647114 A | 3/2014 |
| CN | 103730703 A | 4/2014 |
| CN | 103959515 A | 7/2014 |
| CN | 104009192 A | 8/2014 |
| CN | 104040764 A | 9/2014 |
| CN | 203871438 U | 10/2014 |
| CN | 103855332 B | 4/2017 |
| CN | 107112444 A | 8/2017 |
| CN | 111384404 A | 7/2020 |
| DE | 102012022346 A1 | 5/2014 |
| DE | 102013202367 A1 | 8/2014 |
| DE | 102013203107 A1 | 8/2014 |
| DE | 102013210323 A1 | 12/2014 |

(56)  References Cited

FOREIGN PATENT DOCUMENTS

| | | | |
|---|---|---|---|
| DE | 102014213916 A1 | 1/2016 | |
| DE | 102015011663 A1 | 7/2016 | |
| DE | 102019109472 A1 | 10/2020 | |
| DE | 102021212617 B3 | 1/2023 | |
| EP | 0075842 B1 | 8/1986 | |
| EP | 0602976 A1 | 6/1994 | |
| EP | 1422769 A1 | 5/2004 | |
| EP | 3043404 A1 | 7/2016 | |
| EP | 3358644 A1 | 8/2018 | |
| EP | 4027446 A2 | 7/2022 | |
| EP | 4213295 A1 | 7/2023 | |
| FR | 2551172 A1 | 3/1985 | |
| FR | 2800916 A1 | 5/2001 | |
| FR | 2986374 A1 | 8/2013 | |
| FR | 3114917 A1 | 4/2022 | |
| GB | 1393726 A | 5/1975 | |
| JP | S628932 B2 | 2/1987 | |
| JP | S62117261 A | 5/1987 | |
| JP | H0294619 A | 4/1990 | |
| JP | H06187998 A | 7/1994 | |
| JP | H1027602 A | 1/1998 | |
| JP | H11111265 A | 4/1999 | |
| JP | 2000182581 A | 6/2000 | |
| JP | 2000260423 A | 9/2000 | |
| JP | 2000268789 A | 9/2000 | |
| JP | 2000285886 A | 10/2000 | |
| JP | 2001357882 A | 12/2001 | |
| JP | 2002078229 A | 3/2002 | |
| JP | 2002359006 A | 12/2002 | |
| JP | 2003123832 A | 4/2003 | |
| JP | 2003532277 A | 10/2003 | |
| JP | 2003317731 A | 11/2003 | |
| JP | 2004158222 A | 6/2004 | |
| JP | 2005056729 A | 3/2005 | |
| JP | 2005071658 A | 3/2005 | |
| JP | 2006147534 A | 6/2006 | |
| JP | 2006172766 A | 6/2006 | |
| JP | 2006172773 A | 6/2006 | |
| JP | 2006269288 A | 10/2006 | |
| JP | 2006324114 A | 11/2006 | |
| JP | 2007115678 A | 5/2007 | |
| JP | 3993223 B2 | 10/2007 | |
| JP | 2007335283 A | 12/2007 | |
| JP | 2008034556 A | 2/2008 | |
| JP | 2008198492 A | 8/2008 | |
| JP | 2009059709 A | 3/2009 | |
| JP | 2009176513 A | 8/2009 | |
| JP | 2010062008 A | 3/2010 | |
| JP | 2010073421 A | 4/2010 | |
| JP | 2010153140 A | 7/2010 | |
| JP | 2010157510 A | 7/2010 | |
| JP | 2010245000 A | 10/2010 | |
| JP | 2011077269 A | 4/2011 | |
| JP | 2011524074 A | 8/2011 | |
| JP | 4873703 B2 | 2/2012 | |
| JP | 2012185913 A | 9/2012 | |
| JP | 2012204182 A | 10/2012 | |
| JP | 2013145649 A | 7/2013 | |
| JP | 2013161674 A | 8/2013 | |
| JP | 2014193111 A | 10/2014 | |
| JP | 2014203740 A | 10/2014 | |
| JP | 2015520490 A | 7/2015 | |
| JP | 2016511521 A | 4/2016 | |
| JP | 6204320 B2 | 9/2017 | |
| JP | 2018092724 A | 6/2018 | |
| JP | 2019102421 A | 6/2019 | |
| JP | 2021106164 A | 7/2021 | |
| KR | 100870355 B1 | 11/2008 | |
| KR | 20100016711 A | 2/2010 | |
| KR | 20120023491 A | 3/2012 | |
| KR | 20130098339 A | 9/2013 | |
| KR | 20140005075 A | 1/2014 | |
| KR | 20140039022 A | 3/2014 | |
| KR | 20140041337 | * | 4/2014 |
| KR | 20140085589 A | 7/2014 | |
| KR | 20140144870 A | 12/2014 | |
| KR | 20170018667 A | 2/2017 | |
| KR | 20200091687 A | 7/2020 | |
| TW | I436515 B | 5/2014 | |
| TW | I470855 B | 1/2015 | |
| TW | I508350 B | 11/2015 | |
| WO | WO-8500248 A1 | 1/1985 | |
| WO | WO-0141232 A2 | 6/2001 | |
| WO | WO-03041211 A2 | 5/2003 | |
| WO | WO-2006120959 A1 | 11/2006 | |
| WO | WO-2009032986 A2 | 3/2009 | |
| WO | WO-2009096135 A1 | 8/2009 | |
| WO | WO-2009118910 A1 | 10/2009 | |
| WO | WO-2010032362 A1 | 3/2010 | |
| WO | WO-2010118060 A1 | 10/2010 | |
| WO | WO-2010137415 A1 | 12/2010 | |
| WO | WO-2010150077 A1 | 12/2010 | |
| WO | WO-2011052094 A1 | 5/2011 | |
| WO | WO-2011095758 A1 | 8/2011 | |
| WO | WO-2011099793 A2 | 8/2011 | |
| WO | WO-2012006153 A1 | 1/2012 | |
| WO | WO-2012024499 A1 | 2/2012 | |
| WO | WO-2012036153 A1 | 3/2012 | |
| WO | WO-2012042913 A1 | 4/2012 | |
| WO | WO-2012047596 A2 | 4/2012 | |
| WO | WO-2012060604 A2 | 5/2012 | |
| WO | WO-2012077707 A1 | 6/2012 | |
| WO | WO-2012088442 A2 | 6/2012 | |
| WO | WO-2013036802 A1 | 3/2013 | |
| WO | WO-2013078027 A2 | 5/2013 | |
| WO | WO-2013124423 A1 | 8/2013 | |
| WO | WO-2013173689 A1 | 11/2013 | |
| WO | WO-2014017463 A1 | 1/2014 | |
| WO | WO-2014021057 A1 | 2/2014 | |
| WO | WO-2014093876 A1 | 6/2014 | |
| WO | WO-2014150210 A1 | 9/2014 | |
| WO | WO-2015043934 A1 | 4/2015 | |
| WO | WO-2016060955 A1 | 4/2016 | |
| WO | WO-2016073575 A1 | 5/2016 | |
| WO | WO-2016131141 A1 | 8/2016 | |
| WO | WO-2016205663 A1 | 12/2016 | |
| WO | WO-2020246072 A1 | 12/2020 | |
| WO | WO-2021087465 A1 | 5/2021 | |
| WO | WO-2021102259 A1 | 5/2021 | |
| WO | WO2022039534 | * | 2/2022 |
| WO | WO-2022171425 A1 | 8/2022 | |
| WO | WO-2022212404 A1 | 10/2022 | |
| WO | WO-2025235414 A1 | 11/2025 | |

OTHER PUBLICATIONS

Notice of Allowance for U.S. Appl. No. 17/402,059 dated Jan. 19, 2023, 7 pages.

Notice of Allowance for U.S. Appl. No. 17/402,059 dated Feb. 23, 2023, 2 pages.

Office Action for Indian Application No. IN201717010973 dated Feb. 3, 2023, 2 pages.

Office Action for Japanese Application No. JP20210092052 dated Feb. 7, 2023, 9 pages.

Second Office Action for Indian Application No. 201717010973, dated Dec. 29, 2022, 2 pages.

Armand, M. et al., "Conjugated dicarboxylate anodes for Li-ion batteries," Nature Materials, Feb. 2009, 8(2); pp. 120-125.

Bervas, M. et al., "Investigation of the Lithiation and Delithiation Conversion Mechanisms in a Bismuth Fluoride Nanocomposites," Journal of The Electrochemical Society, Mar. 2006, 153(4), pp. A799-A808.

Canadian Office Action for Application No. CA20162969135 mailed Dec. 1, 2022, 5 pages.

Chan, C. K. et al., "High-performance lithium battery anodes using silicon nanowires," Nature Nanotechnology, Jan. 2008, 3(1), pp. 31-35.

Decision of Rejection for Japanese Application No. 2017-517309, mailed Feb. 2, 2021, 7 pages.

Decision to Grant for Japanese Application No. 2020-184414, mailed May 23, 2022, 3 Pages.

(56) References Cited

OTHER PUBLICATIONS

Duduta, M. et al., "Semi-Solid Lithium Rechargeable Flow Battery," Advanced Energy Materials, Jul. 2011, 1(4), pp. 511-516.
Examination Report for Canadian Application No. 2,962,788 dated Oct. 6, 2021, 3 pages.
Examination Report for Canadian Application No. 2,969,135, mailed Mar. 30, 2022, 3 pages.
Examination Report No. 1 for Australian Application No. 2016280285, dated Nov. 2, 2020, 6 pages.
Extended European Search Report for European Application No. 13791074.1, mailed Mar. 31, 2016, 6 pages.
Extended European Search Report for European Application No. 16812533.4, mailed Nov. 19, 2018, 7 pages.
Extended European Search Report for European Application No. 20153431.0, mailed Aug. 7, 2020, 12 pages.
Extended European Search Report for European Application No. 21196368.1, mailed Feb. 16, 2022, 8 pages.
Final Rejection Office Action for U.S. Appl. No. 17/109,686 mailed on Jul. 20, 2022, 14 pages.
First Examination Report for Indian Application No. 201717010973, mailed Aug. 16, 2020, 6 pages.
First Office Action for Chinese Application No. 201580057914.4, dated Jul. 8, 2019, 17 pages.
First Office Action for Chinese Application No. 201680004584.7, dated Feb. 3, 2019, 17 pages.
First Office Action for Chinese Application No. 202110490592.X dated May 11, 2022, 21 pages.
Fourth Office Action for Chinese Application No. 201580057914.4, dated Jul. 29, 2020, 14 pages.
International Preliminary Report on Patentability for International Application No. PCT/US2020061498, mailed Jun. 2, 2022, 13 pages.
International Search Report and Written Opinion for International Application No. PCT/US2012/054219, mailed Feb. 21, 2013, 13 pages.
International Search Report and Written Opinion for International Application No. PCT/US2013/041537, mailed Oct. 10, 2013.
International Search Report and Written Opinion for International Application No. PCT/US2015/058992, mailed Jan. 14, 2016, 10 pages.
International Search Report and Written Opinion for International Application No. PCT/US2016/038098, mailed Oct. 31, 2016, 14 pages.
International Search Report and Written Opinion for International Application No. PCT/US2022/022382, mailed Jul. 18, 2022, 14 pages.
Invitation to Pay Additional Fees for International Application No. PCT/US2020/061498, mailed Feb. 18, 2021, 13 pages.
Li, H. et al., "Li-Storage via Heterogeneous Reaction in Selected Binary Metal Fluorides and Oxides," Journal of Electrochemical Society, Oct. 2004, 151(11), pp. A1878-A1885.
Nakahara, K. et al. "Rechargeable batteries with organic radical cathodes," Chemical Physics Letters, Jun. 2002, pp. 359:351-354.
Nishide, H. et al., "Organic radical battery: nitroxide polymers as a cathode-active material," Electrochimica Acta, Nov. 2004, 50(2), pp. 827-831.
Non Final Office Action for U.S. Appl. No. 17/169,862, dated Nov. 30, 2022, 12 pages.
Notice of Reasons for Rejection for Japanese Application No. 2021-054104, mailed Sep. 13, 2022, 4 pages.
Notice of Allowance for U.S. Appl. No. 17/109,686, dated Nov. 16, 2022, 10 pages.
Notice of Allowance for U.S. Appl. No. 17/109,686, dated Nov. 23, 2022, 5 pages.
Notice of Reasons for Rejection for Japanese Application No. 2018-088757, mailed Jan. 21, 2021, 4 pages.
Notice of Reasons for Rejection for Japanese Application No. 2015-512878, mailed Apr. 19, 2017, 7 pages.
Notice of Reasons for Rejection for Japanese Application No. 2015-512878, mailed Mar. 29, 2019, 13 pages.

Notice of Reasons for Rejection for Japanese Application No. 2015-512878, mailed Oct. 1, 2019, 6 pages.
Notice of Reasons for Rejection for Japanese Application No. 2017-517309, mailed Aug. 26, 2019, 11 pages.
Notice of Reasons for Rejection for Japanese Application No. 2017-517309, mailed May 18, 2020, 13 pages.
Notice of Reasons for Rejection for Japanese Application No. 2018-088757, mailed Apr. 2, 2020, 6 pages.
Notice of Reasons for Rejection for Japanese Application No. 2018-088757, mailed Apr. 8, 2019, 9 pages.
Notice of Reasons for Rejection for Japanese Application No. 2018-088757, mailed Oct. 2, 2019, 6 pages.
Notice of Reasons for Rejection for Japanese Application No. 2018-088757, mailed Oct. 27, 2020, 7 pages.
Notification of Reexamination for Chinese Application No. 201680004584.7, dated Oct. 28, 2020, 21 pages.
Office Action for Canadian Application No. 2,962,788, mailed Nov. 1, 2022, 4 pages.
Office Action for Korean Application No. 10-2017-7015132, mailed Oct. 12, 2022, 17 pages.
Office Action Final for U.S. Appl. No. 16/736,460, mailed Sep. 28, 2021, 16 pages.
Office Action for Canadian Application No. 2,962,788, mailed Mar. 31, 2022, 4 pages.
Office Action for Japanese Application No. 2021-054104, mailed Dec. 27, 2021, 7 pages.
Office Action for U.S. Appl. No. 16/201,283, mailed Oct. 23, 2020, 13 pages.
Office Action for U.S. Appl. No. 17/109,686, mailed Feb. 9, 2022, 15 pages.
Office Action for Vietnam Application No. 1-2017-01769, dated Jan. 29, 2021, 2 pages.
Office Action for European Application No. 13791074.1, mailed Aug. 7, 2018, 5 pages.
Office Action for European Application No. 15794037.0, dated Aug. 27, 2020, 7 pages.
Office Action for European Application No. 15794037.0, dated Jan. 3, 2020, 6 pages.
Office Action for European Application No. 15794037.0, dated Jun. 4, 2019, 9 pages.
Office Action for European Application No. 16812533.4, mailed Jul. 31, 2020, 4 pages.
Office Action for Indian Application No. 201717017343, mailed Jul. 9, 2020, 6 pages.
Office Action for Japanese Application No. 2017-526929, mailed Feb. 18, 2020, 19 pages.
Office Action for Japanese Application No. 2021-092052, mailed Mar. 28, 2022, 13 pages.
Office Action for U.S. Appl. No. 13/607,021, mailed Apr. 20, 2015, 8 pages.
Office Action for U.S. Appl. No. 13/607,021, mailed Jul. 10, 2015, 4 pages.
Office Action for U.S. Appl. No. 13/832,836, mailed Feb. 26, 2015, 9 pages.
Office Action for U.S. Appl. No. 14/543,489, mailed Feb. 12, 2016, 7 pages.
Office Action for U.S. Appl. No. 14/543,489, mailed Jul. 6, 2015, 9 pages.
Office Action for U.S. Appl. No. 14/926,760, mailed Feb. 25, 2019, 9 pages.
Office Action for U.S. Appl. No. 14/926,760, mailed Jun. 27, 2018, 10 pages.
Office Action for U.S. Appl. No. 14/932,153, mailed Aug. 7, 2018, 6 pages.
Office Action for U.S. Appl. No. 14/932,153, mailed Jan. 31, 2019, 7 pages.
Office Action for U.S. Appl. No. 15/185,625, mailed May 18, 2018, 9 pages.
Office Action for U.S. Appl. No. 15/185,625, mailed Nov. 2, 2017, 11 pages.
Office Action for U.S. Appl. No. 15/188,374, mailed Apr. 12, 2017, 9 pages.

(56)     References Cited

OTHER PUBLICATIONS

Office Action for U.S. Appl. No. 15/724,701, mailed Apr. 4, 2019, 8 pages.
Office Action for U.S. Appl. No. 16/201,283, mailed Jun. 15, 2020, 13 pages.
Office Action for U.S. Appl. No. 16/705,949, mailed Dec. 9, 2020, 7 pages.
Office Action for U.S. Appl. No. 16/736,460, mailed Feb. 2, 2021, 13 pages.
Office Action for U.S. Appl. No. 17/402,059, filed Aug. 5, 2022, 6 pages.
Plitz, I. et al., "Structure and Electrochemistry of Carbon-Metal Fluoride Nanocomposites Fabricated by a Solid State Redox Conversion Reaction," Journal of The Electrochemical Society, Dec. 2004, 152(2), pp. A307-A315.
Reinhart et al., "Research and Demonstration Center for the Production of Large-Area Lithium-Ion Cells," Future Trends in Production Engineering, Jan. 1, 2012, pp. 3-12.
Rejection Decision for Chinese Application No. 201680004584.7, dated May 11, 2020, 17 pages.
Restriction Requirement for U.S. Appl. No. 17/169,862, dated Sep. 21, 2022, 9 pages.
Second Office Action for Chinese Application No. 201580057914.4, dated Dec. 12, 2019, 7 pages.
Second Office Action for Chinese Application No. 201680004584.7, dated Aug. 15, 2019, 27 pages.
Subsequent Substantive Examination Report for Philippines Patent Application No. 1-2017-500970, dated Dec. 6, 2019, 4 pages.
Subsequent Substantive Examination Report for Philippines Patent Application No. 1-2017-500970, dated Sep. 24, 2019, 10 pages.
Substantive Examination Adverse Report (Section 30(1) / 30(2)) and Search Report for Malaysian Application No. PI2017000573, mailed May 8, 2020, 4 pages.
Substantive Examination Adverse Report (Section 30(1) / 30(2)) and Search Report for Malaysian Application No. PI2017000885, mailed Jun. 18, 2020, 4 pages.
Substantive Examination Report (Restriction) for Philippines Patent Application No. 1-2017-500970, dated Mar. 14, 2019, 3 pages.
Third Office Action for Chinese Application No. 201580057914.4, dated Apr. 13, 2020, 21 pages.
Third Office Action for Chinese Application No. 201680004584.7, dated Jan. 3, 2020, 24 pages.
Examination Report for Canadian Application No. 2,962,788, mailed Mar. 23, 2023, 3 pages.

Grant Notification for Indonesian Application No. P00201703544, mailed Apr. 5, 2023, 4 pages.
Non-Final Office Action for U.S. Appl. No. 17/242,483 mailed on Apr. 26, 2023, 10 pages.
Notice of Allowance for U.S. Appl. No. 17/169,862 dated Apr. 21, 2023, 8 pages.
Office Action and Search Report for Chinese Application No. CN202110490592.X mailed Feb. 23, 2023, 14 pages.
Office Action for Indian Application No. IN201717010973 dated Feb. 27, 2023, 2 pages.
Office Action for Japanese Application No. JP2022099328 mailed May 8, 2023, 7 pages.
Office Action for Korean Application No. KR20177018200 mailed Feb. 21, 2023, 14 pages.
Office Action for U.S. Appl. No. 17/683,557, dated Mar. 28, 2023, 8 pages.
Pampel et al., "A systematic comparison of the packing density of battery cell-to-pack concepts at different degrees of implementation," Results in Engineering, Available Online: Nov. 18, 2021, [Retrieved: Oct. 8, 2021, https://www.sciencedirect.com/science/article/pii/S2590123021001110], 3 pages.
U.S. Appl. No. 15/262,581, filed Sep. 12, 2016; Inventor Chiang, Yet-Ming et al.
U.S. Appl. No. 15/425,368, filed Feb. 6, 2017; Inventor Slocum, Alexander H.
U.S. Appl. No. 16/139,791, filed Sep. 24, 2018; Inventor Ota, Naoki et al.
U.S. Appl. No. 16/736,553, filed Jan. 7, 2020; Inventor Ota, Naoki et al.
U.S. Appl. No. 18/223,894, filed Jul. 19, 2023; Inventor Chen, Junzheng et al.
U.S. Appl. No. 18/411,431, filed Jan. 12, 2024; Inventor Chiang, Yet-Ming et al.
U.S. Appl. No. 18/974,585, filed Dec. 9, 2024; Inventor Tan, Taison et al.
U.S. Appl. No. 19/068,803, filed Mar. 3, 2025; Inventor Ota, Naoki et al.
U.S. Appl. No. 19/240,917, filed Jun. 17, 2025; Inventor Doherty, Tristan et al.
U.S. Appl. No. 19/247,506, filed Jun. 24, 2025; Inventor Chen, Junzheng et al.
U.S. Appl. No. 19/361,563, filed Oct. 17, 2025; Inventor Bazzarella, Ricardo et al.

* cited by examiner

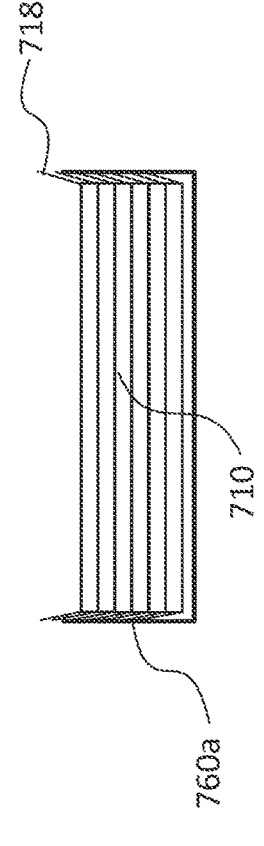
FIG. 7C
718
710
760a
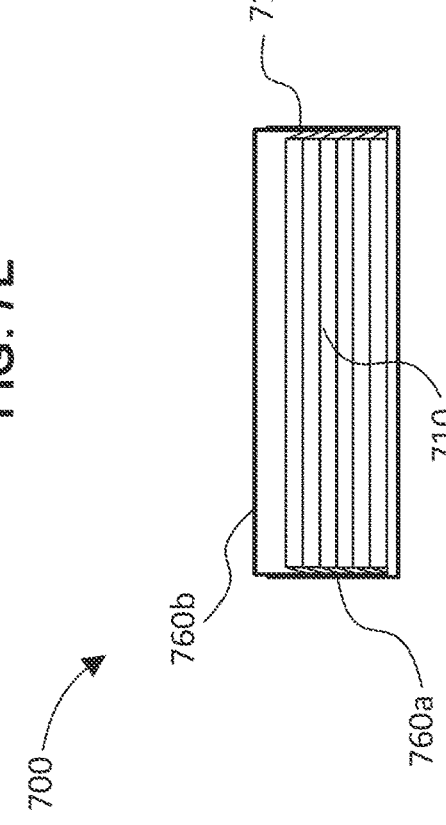
FIG. 7E
718
710
760b
760a
700
FIG. 7B
718
710
760a
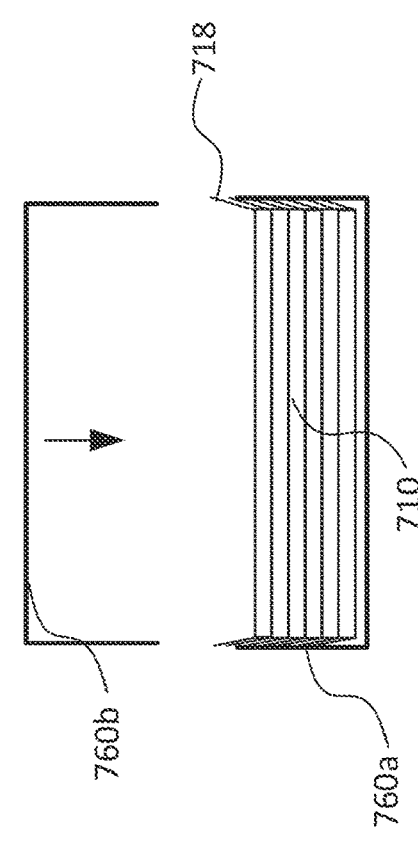
FIG. 7D
718
760b
710
760a

900

925         910         918

FIG. 10A
FIG. 10B
FIG. 10C
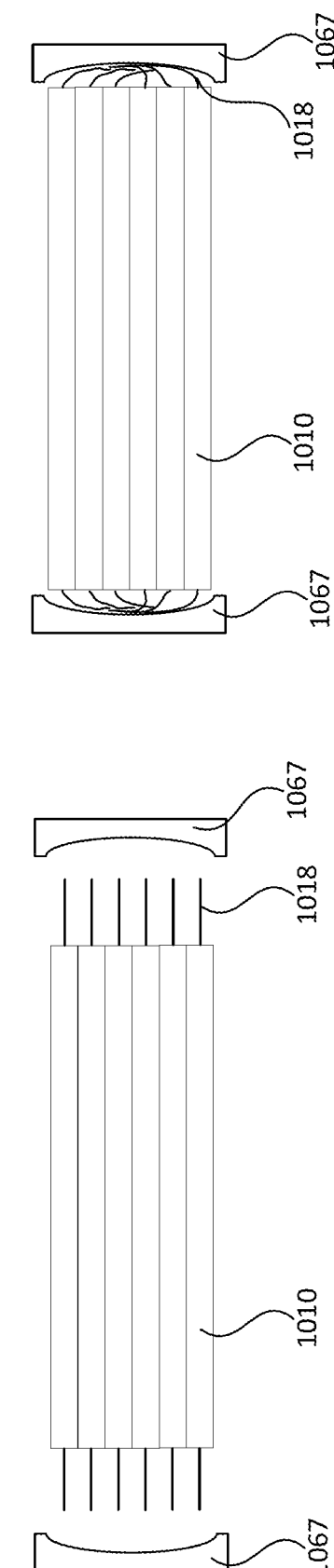
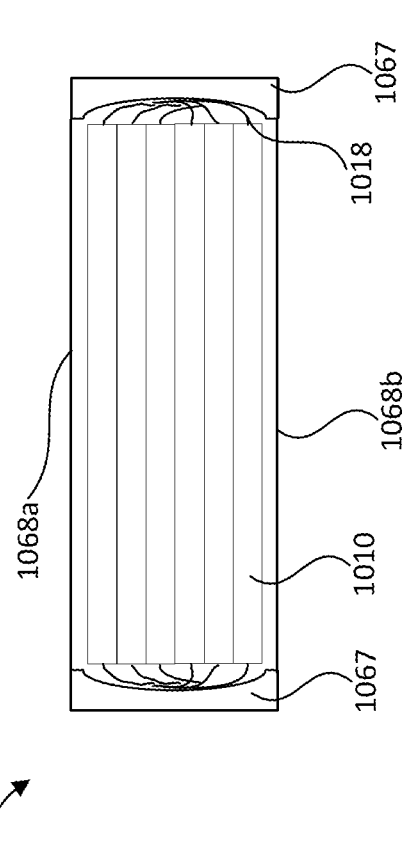

ELECTROCHEMICAL CELL MODULES AND METHODS OF PRODUCING THE SAME

CROSS REFERENCE TO RELATED APPLICATIONS

This application claims priority and benefit of U.S. Provisional Application No. 63/272,755 filed Oct. 28, 2021, both entitled "Electrochemical Cell Modules and Methods of Producing the Same," the disclosure of which is hereby incorporated by reference in its entirety.

TECHNICAL FIELD

Embodiments described herein relate to electrodes and electrochemical cell modules with stacks of electrochemical cells.

BACKGROUND

Electrochemical cells can be packaged in module cases to achieve large voltages and/or capacities for a desired purpose. Modules can include multiple electrochemical cells, such that risk is minimized. In other words, the effects of one defective cell can be localized to that cell, such that the electroactive materials in the other cells are not contaminated. However, cell modules often include several additional components for proper functioning. The extra components can negatively affect volumetric capacity of the modules. Minimizing dead space in the cell modules can improve the volumetric capacity of the modules.

SUMMARY

Embodiments described herein include electrochemical cell modules. In some aspects, an electrochemical cell module can include a first electrochemical cell. The first electrochemical cell includes an anode material disposed on an anode current collector, a cathode material disposed on a cathode current collector, a separator disposed between the anode material and the cathode material and extending beyond the anode material and the cathode material, and a pouch material encasing the first electrochemical cell. The pouch material extends beyond the separator. The electrochemical cell module further includes a second electrochemical cell and a module case housing the first electrochemical cell and the second electrochemical cell. The portion of the separator that extends beyond the outer edge of the anode material and the cathode material and the portion of the pouch material that extends beyond the outer edge of the separator are folded at an angle of about 80 degrees to about 110 degrees with respect to the anode material and the cathode material.

In some embodiments, the electrochemical cell module can include a heat sink disposed between the first electrochemical cell and the second electrochemical cell. In some embodiments, the heat sink extends beyond the outer edge of the anode material and the outer edge of the cathode material, and wherein the heat sink is folded such that a portion of the heat sink contacts an interior surface of the module case. In some embodiments, the electrochemical cell module can include a temperature sensor disposed between the first electrochemical cell and the second electrochemical cell.

BRIEF DESCRIPTION OF THE DRAWINGS

FIGS. 2A-2B are illustrations of an electrochemical cell, according to an embodiment.

FIGS. 7A-7E are illustrations of a method of forming an electrochemical cell module, according to an embodiment.

FIGS. 10A-10C are illustrations of a method of forming an electrochemical cell module, according to an embodiment.

DETAILED DESCRIPTION

Figure 1:
FIG. 1 is a block diagram of an electrochemical cell module, according to an embodiment.
Figure 1:
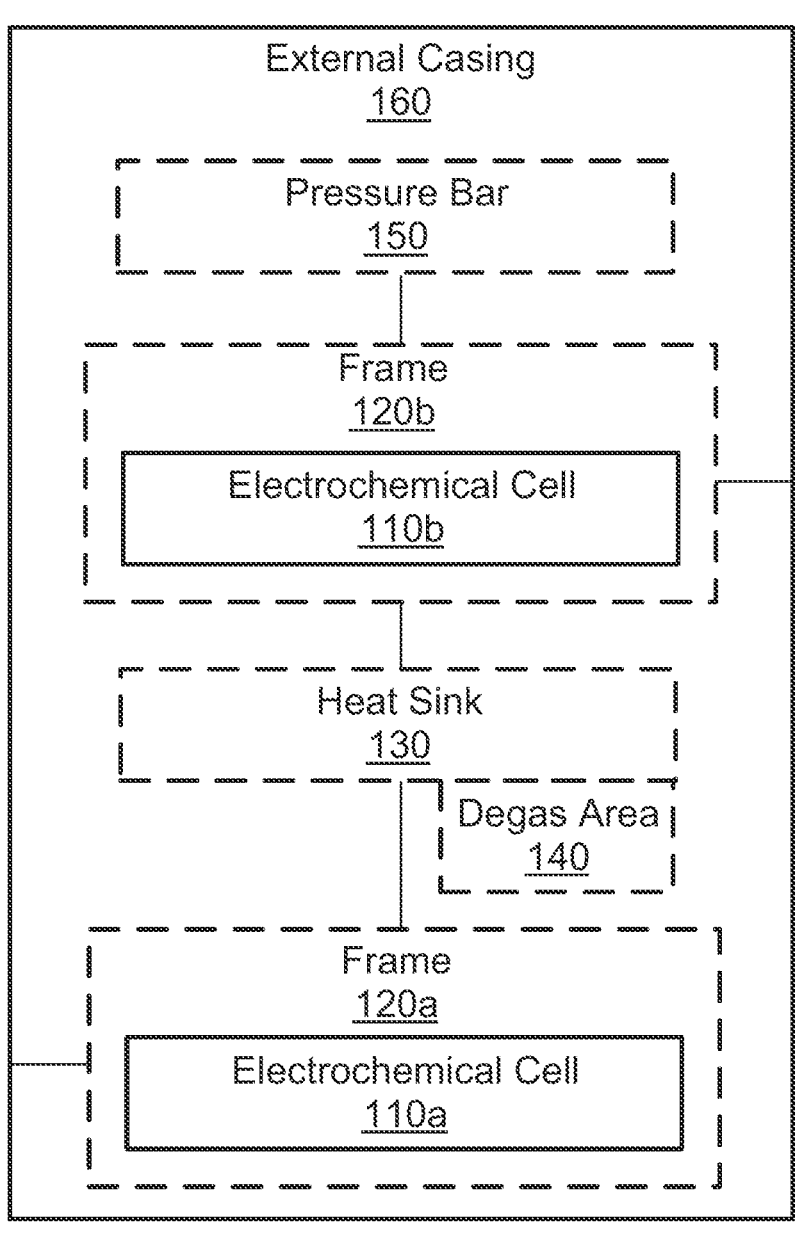

Embodiments described herein relate to electrochemical cell modules and methods of producing the same. Unused space is a significant problem faced with large arrays of electrochemical cells. For example, a cathode and an anode can be of different sizes, in order to properly maximize material utilization. Additionally, a separator can be sized such that its length and width dimensions are greater than those of the anode and the cathode, such that the separator can be coupled directly to a pouch material to prevent cross contamination between the anode and the cathode. By stacking multiple cells in a module, more electroactive material per unit volume can be realized. The pouch material can also have longer length and width dimensions than the separator to aid in containment of the electroactive material. These extensions in the separator and the pouch material can create unused space with no electroactive material therein. By folding the extended portions in the electrochemical cell stack, the dead space can be minimized. Examples of electrochemical cell stacks are described further in U.S. Pat. No. 10,181,587 ("the '587 patent"), filed Jun. 17, 2016, and entitled, "Single Pouch Battery Cells and Methods of Manufacture," the entire disclosure of which is hereby incorporate by reference.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used herein, the term "semi-solid" refers to a material that is a mixture of liquid and solid phases, for example, such as a particle suspension, a slurry, a colloidal suspension, an emulsion, a gel, or a micelle.

FIG. 1 is a block diagram of an electrochemical cell module 100, according to an embodiment. As shown, the electrochemical cell module 100 includes a first electrochemical cell 110a, a second electrochemical cell 110b (collectively referred to as electrochemical cells 110), and an external casing 160. The electrochemical cell module 100 can also include frames 120a, 120b (collectively referred to as frames 120), a heat sink 130, a degas area 140, and a pressure member 150.

In some embodiments, the electrochemical cells 110 can be the same or substantially similar to the electrochemical cells described in the '587 patent. Each of the electrochemical cells 110 can include an anode material disposed on an anode current collector, a cathode material disposed on a cathode current collector, and a separator disposed between the anode material and the cathode material. The separator can be large enough that a portion of the separator extends beyond an outer edge of the anode material and an outer edge of the cathode material. The electrochemical cells 110 can further include a pouch material at least partially encasing the anode material, the anode current collector, the cathode material, the cathode current collector, and the separator. In some embodiments, the pouch material can contact the anode current collector, the cathode current collector, and/or the separator. The pouch material can be large enough that a portion of the pouch material extends beyond outer bounds of the separator. In order to minimize unused space in the electrochemical cell module, the pouch material and the separator can be folded relative to the anode material and the cathode material, rather than extending outward from the anode material and the cathode material.

As shown, the electrochemical cell module 100 includes two electrochemical cells 110. In some embodiments, the electrochemical cell module 100 can include 3, 4, 5, 6, 7, 8, 9, 10, 11, 12, 13, 14, 15, 16, 17, 18, 19, 20, at least about 20, at least about 25, at least about 30, at least about 35, at least about 40, at least about 45, at least about 50, at least about 55, at least about 60, at least about 65, at least about 70, at least about 75, at least about 80, at least about 85, at least about 90, at least about 95, or at least about 100 electrochemical cells 110, inclusive of all values and ranges therebetween. In some embodiments, the electrochemical cells 110 can be connected in parallel. In some embodiments, the electrochemical cells 110 can be connected in series. In some embodiments, the electrochemical cells 110 can be connected both in series and in parallel. In some embodiments, one or more of the electrochemical cells 110 can include a single unit cell. In some embodiments, one or more of the electrochemical cells 110 can include a bi-cell.

The stackable characteristics of the electrochemical cells 110 can allow for ease of production. In some embodiments, the electrochemical cells 110 can be manufactured via pick-and-place assembly. The electrochemical cells 110 can be manufactured without winding or Z-folding to stack them together. Rather, the pick-and-place procedure can produce the electrochemical cells 110 side-by-side and the electrochemical cells 110 can be stacked upon each other after production is complete. The pick-and-place assembly can also facilitate extra quality control (QC) inspection. For example, a casting and assembly apparatus can produce electrochemical cells 110 via pick-and-place assembly, and the electrochemical cells 110 can be stacked in a first stack. The electrochemical cells 110 can be de-stacked and can individually go through extra QC inspection before assembly into a second stack in the electrochemical cell module 100. This extra QC inspection can ensure that each of the electrochemical cells 110 that are included in the electrochemical cell module 100 are of high quality. In some embodiments, the electrochemical cells 110 can be examined via infrared (IR) inspection prior to assembling the electrochemical cells 110 into the second stack in the electrochemical cell module 100.

The frames 120 provide support members for the electrochemical cells 110. In some embodiments, the frames 120 can be stacked upon one another. In some embodiments, the frames can include holes for coupling members (e.g., bolts, screws) to pass through. In some embodiments, the frames 120 can be composed of plastic, polypropylene (PP), polyethylene (PE), polyethylene terephthalate (PET), or any combination thereof. In some embodiments, the frames 120 can be non-flammable and/or flame retardant.

The heat sink 130 draws heat away from the electrochemical cells 110 and the active material therein. In some embodiments, the heat sink 130 can include a metal sheet. In some embodiments, the electrochemical cell module 100 can include multiple heat sinks 130. In some embodiments, the heat sinks 130 can be placed between each pair of electrochemical cells 110. In some embodiments, the heat sinks 130 can be placed intermittently between electrochemical cells 110. In some embodiments, the heat sink 130 can be integrated into one or more of the frames 120. In some embodiments, the heat sink 130 can contact the electrochemical cells 110, the frames 120, and/or the external casing 160. In some embodiments, the heat sink 130 can be bent to contact the top and sides of the electrochemical cells 110 while also contacting the interior walls of the external casing 160. In some embodiments, the heat sink 130 can include a hole for degassing.

In some embodiments, the degas area 140 can be formed from holes in various components in the electrochemical cell module 100, and the holes can be covered once the formation of the electrochemical cell module 100 is complete. In other word, the degas area 140 can be a region of space that is open to the outside environment during production of the electrochemical cell module 100 and sealed after production and degassing is complete. Examples of such implementations are further described in U.S. Patent Publication No. 2020/0411825 ("the '825 publication"), filed Jun. 26, 2020 and entitled, "Dual Electrolyte Electrochemical Cells, Systems, and Methods of Manufacturing the Same," the entire disclosure of which is hereby incorporated by reference.

The pressure member 150 can exert a force upon the stack of electrochemical cells 110. This exerted force can press the electroactive material of the electrochemical cells 110, such that ion transfer between adjacent electrodes is promoted. In some embodiments, the pressure member 150 can be fixedly coupled to one or more of the frames 120. As shown, the pressure member 150 is on top of the electrochemical cell 110b near the top of the electrochemical cell module 100. In some embodiments, the pressure member 150 can be located near the bottom of the electrochemical cell module 100. In some embodiments, the pressure member 150 can be located between the electrochemical cells 110. In some embodiments, the pressure member 150 can include a spring to exert force upon the electrochemical cells 110. In some embodiments, the pressure member 150 can include a bar (e.g., a metal bar).

The external casing 160 houses the other components of the electrochemical cell module 110. The external casing 160 includes positive and negative terminals. In some embodiments, the external casing 160 can be composed of a metal. A metal casing can be beneficial for the electrochemical cells 110 if they are connected in parallel. The external casing 160 can include an aluminum base at the positive terminal. The external casing 160 can include nickel, a nickel plate, iron, and/or copper at the negative terminal. In some embodiments, a jumper tab can be used to connect the terminals. In some embodiments, the external casing 160 can include plastic on its exterior surfaces with metal on its interior surfaces. In some embodiments, in a series connection, weld tabs of the first and last electrochemical cells in the series can be welded or mechanically connected to the inside of the external casing.

Figure 2A:
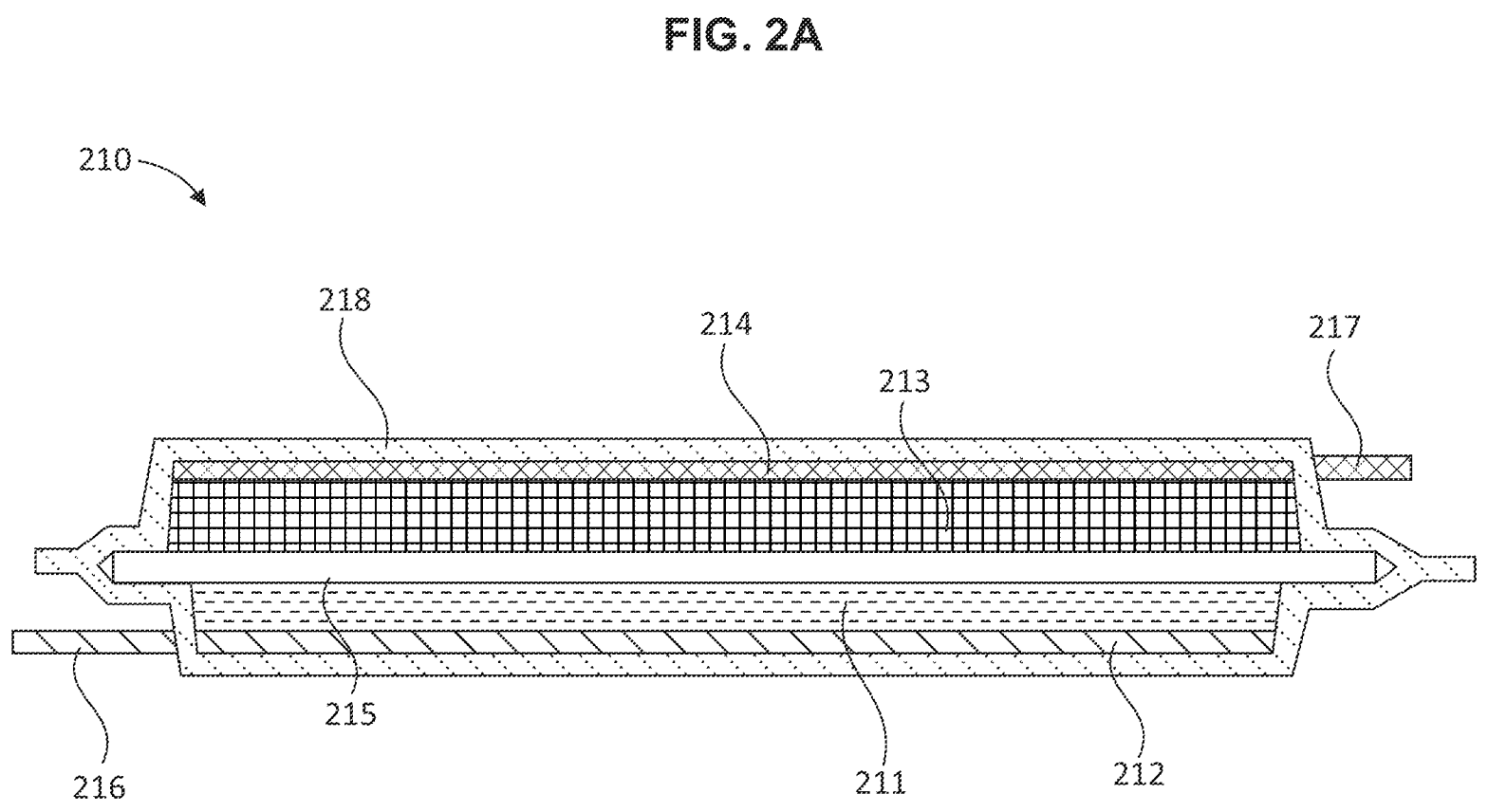
Figure 2B:
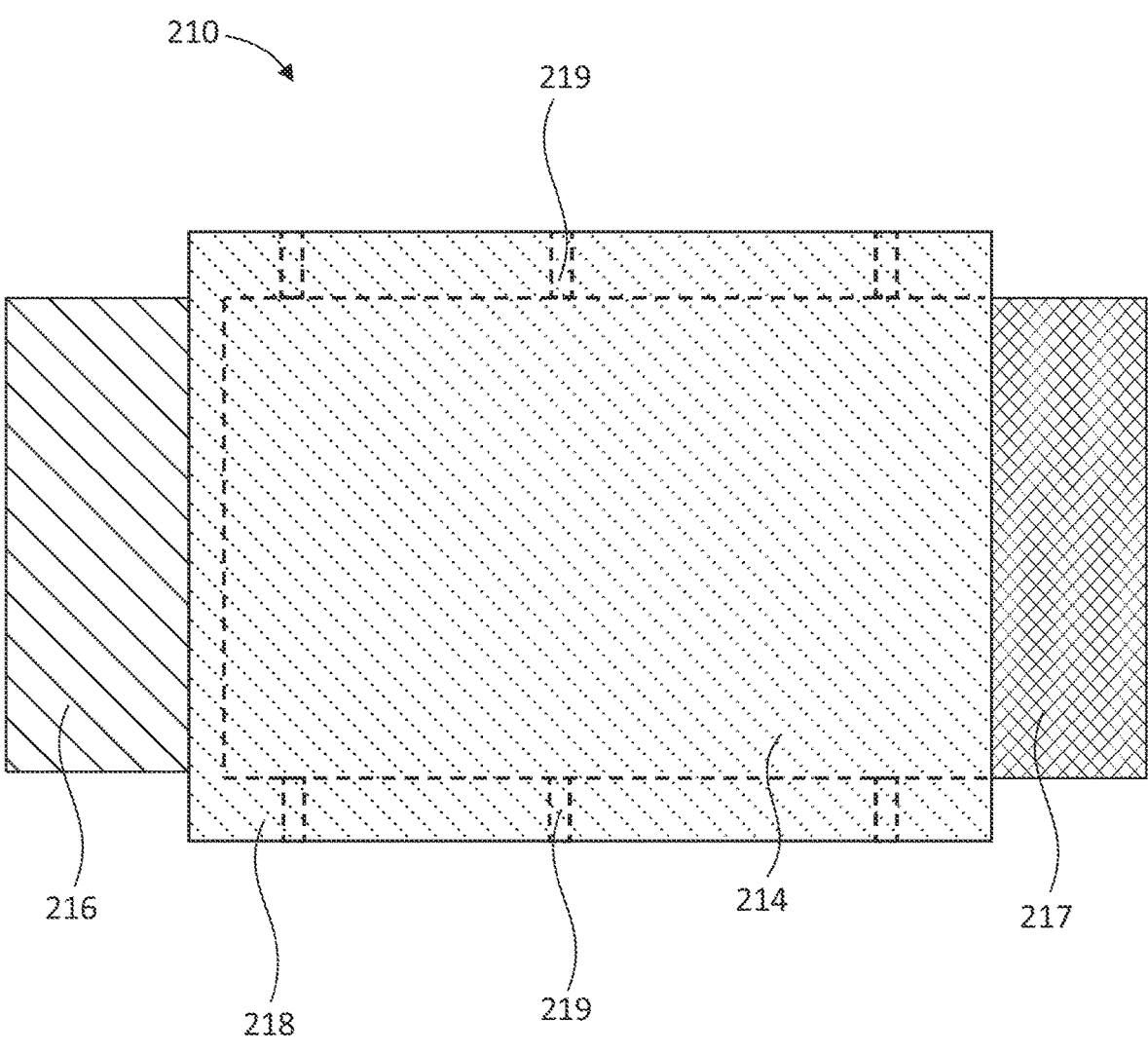

FIGS. 2A-2B show an electrochemical cell 210, according to an embodiment. FIG. 2A shows a cross-sectional view of the electrochemical cell 210, while FIG. 2B shows an overhead view of the electrochemical cell 210. The electrochemical cell 210 can be integrated into an electrochemical cell module, such as the electrochemical cell module 100, as described above with reference to FIG. 1. As shown, the electrochemical cell 210 includes an anode material 211 disposed on an anode current collector 212, a cathode material 213 disposed on a cathode current collector 214, with a separator 215 disposed between the anode material 211 and the cathode material 213. The anode current collector 212 includes an anode tab 216 and the cathode current collector 214 includes a cathode tab 217. A pouch material 218 is disposed around the outside of the anode current collector 212 and the cathode current collector 214 to form a pouch. As shown, the anode tab 216 and the cathode tab 217 can extend to a region exterior to the pouch material 218. The anode tab 216 and/or the cathode tab 217 can be coupled to an anode tab and/or a cathode tab of one or more adjacent electrochemical cells in an electrochemical cell module. In some embodiments, the electrochemical cell 210 can be the same or substantially similar to the electrochemical cells described in the '587 patent.

As shown, the pouch material 218 is of sufficient size, such that the pouch material 218 extends beyond an outer edge of the separator 215. In other words, the pouch material 218 has a length greater than a length of the separator 215 and a width greater than a width of the separator 215. In some embodiments, the length of the pouch material 218 can be greater than the length of the separator 215 by about 100 μm, about 200 μm, about 300 μm, about 400 μm, about 500 μm, about 600 μm, about 700 μm, about 800 μm, about 900 μm, about 1 mm, about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, about 1 cm, about 1.5 cm, about 2 cm, about 2.5 cm, about 3 cm, about 3.5 cm, about 4 cm, about 4.5 cm, about 5 cm, about 5.5 cm, about 6 cm, about 6.5 cm, about 7 cm, about 7.5 cm, about 8 cm, about 9.5 cm, or about 10 cm, inclusive of all values and ranges therebetween. In some embodiments, the width of the pouch material 218 can be greater than the width of the separator 215 by about 100 μm, about 200 μm, about 300 μm, about 400 μm, about 500 μm, about 600 μm, about 700 μm, about 800 μm, about 900 μm, about 1 mm, about 1.5 mm, about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, about 1 cm, about 1.5 cm, about 2 cm, about 2.5 cm, about 3 cm, about 3.5 cm, about 4 cm, about 4.5 cm, about 5 cm, about 5.5 cm, about 6 cm, about 6.5 cm, about 7 cm, about 7.5 cm, about 8 cm, about 9.5 cm, or about 10 cm, inclusive of all values and ranges therebetween.

As shown, the pouch material 218 includes vent holes 219. The vent holes 219 allow for degassing from the electrochemical cell 210 during production and initial cycling of the electrochemical cell 210. In some embodiments, the vent holes 219 can be formed from laminating a portion of the outer edges of the pouch material 218 and leaving one or more portions of the outer edges of the material 218 unlaminated. In some embodiments, the vent holes 219 can remain open during operation of the electrochemical cell 210. In some embodiments, the electrochemical cell 210 can be disposed in an external casing (e.g., the external casing 160 as described above with reference to FIG. 1). In some embodiments, the external casing can be hermetically sealed to prevent the electrochemical cell 210 from exposure to the outside environment during operation.

Figure 3A:
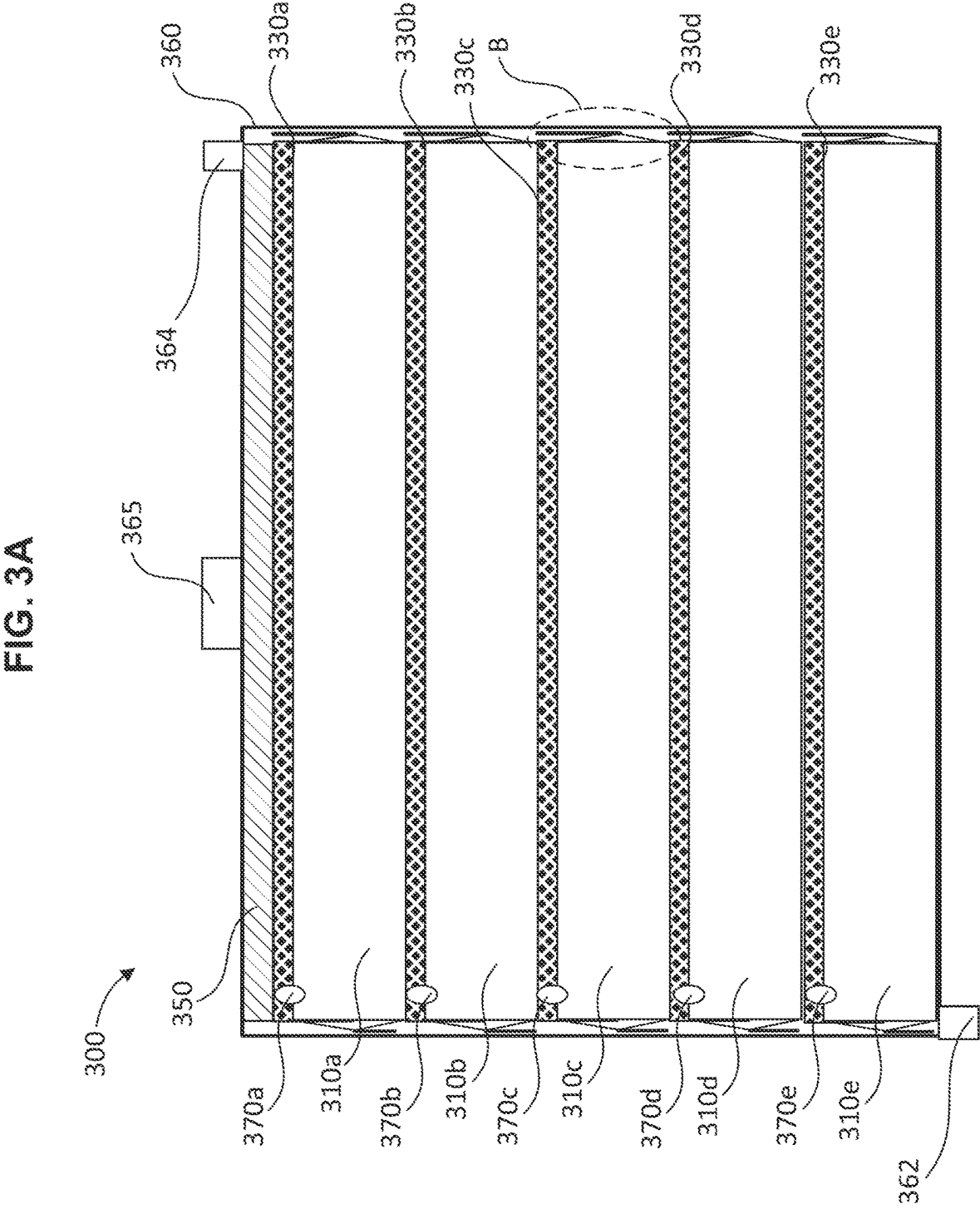
FIGS. 3A-3F are illustrations of an electrochemical cell module, according to an embodiment.
Figure 3B:
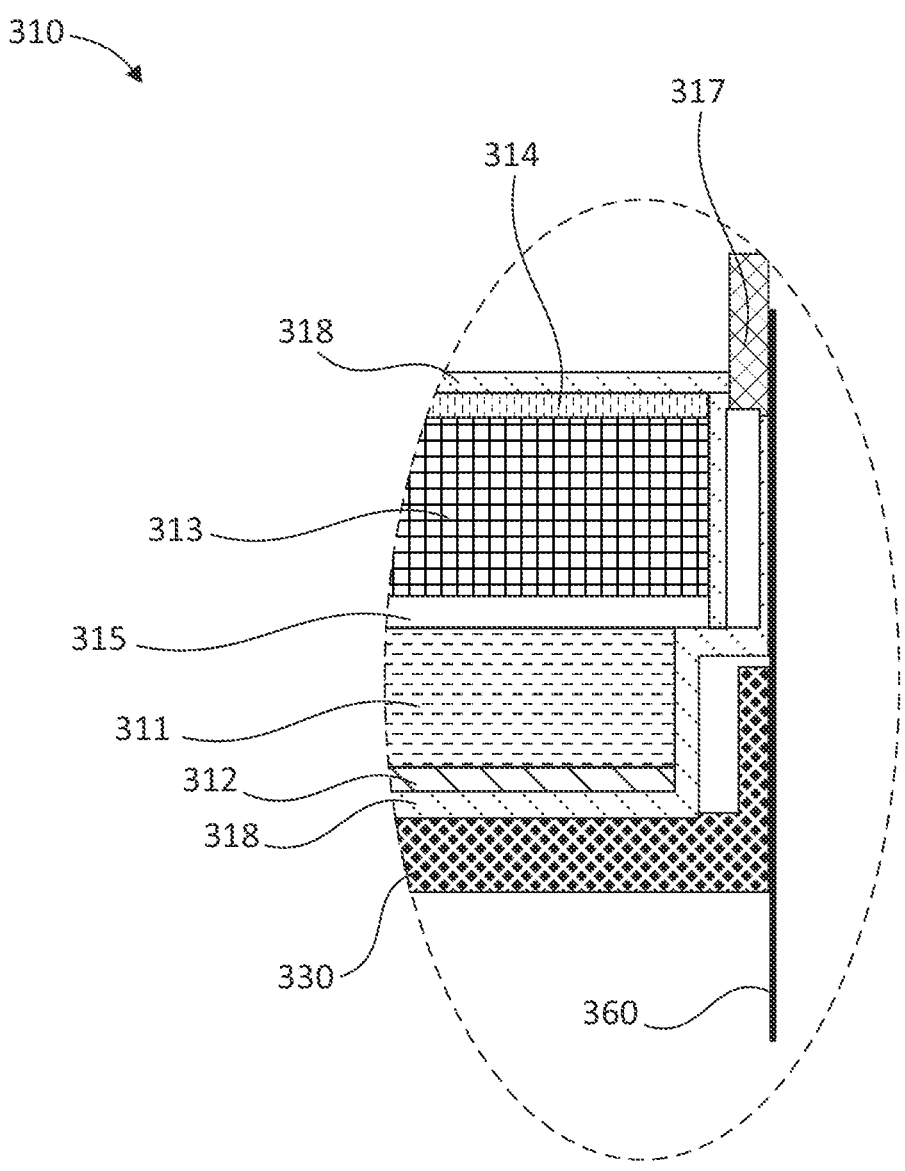
Figure 3C:
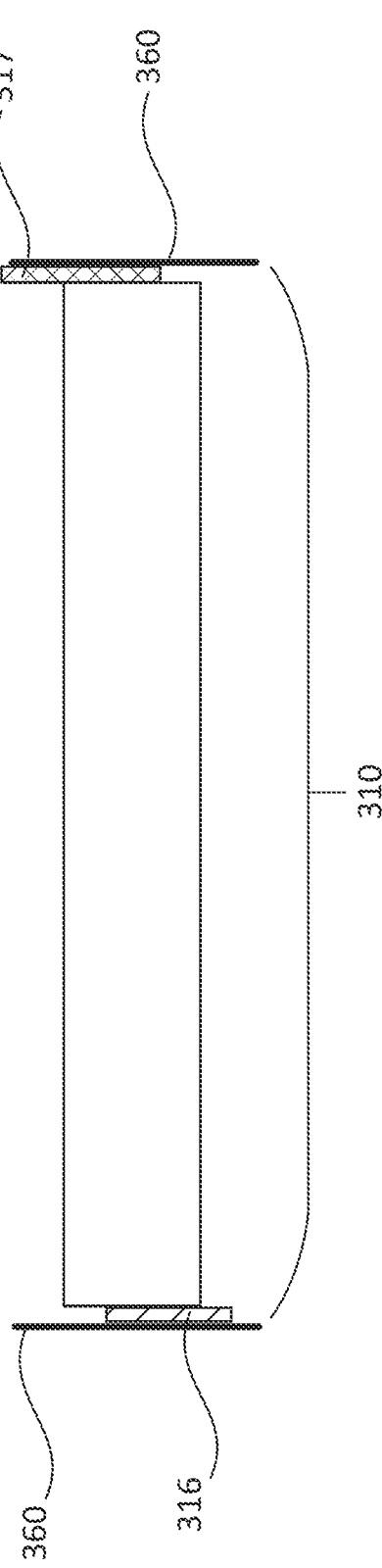
Figure 3D:
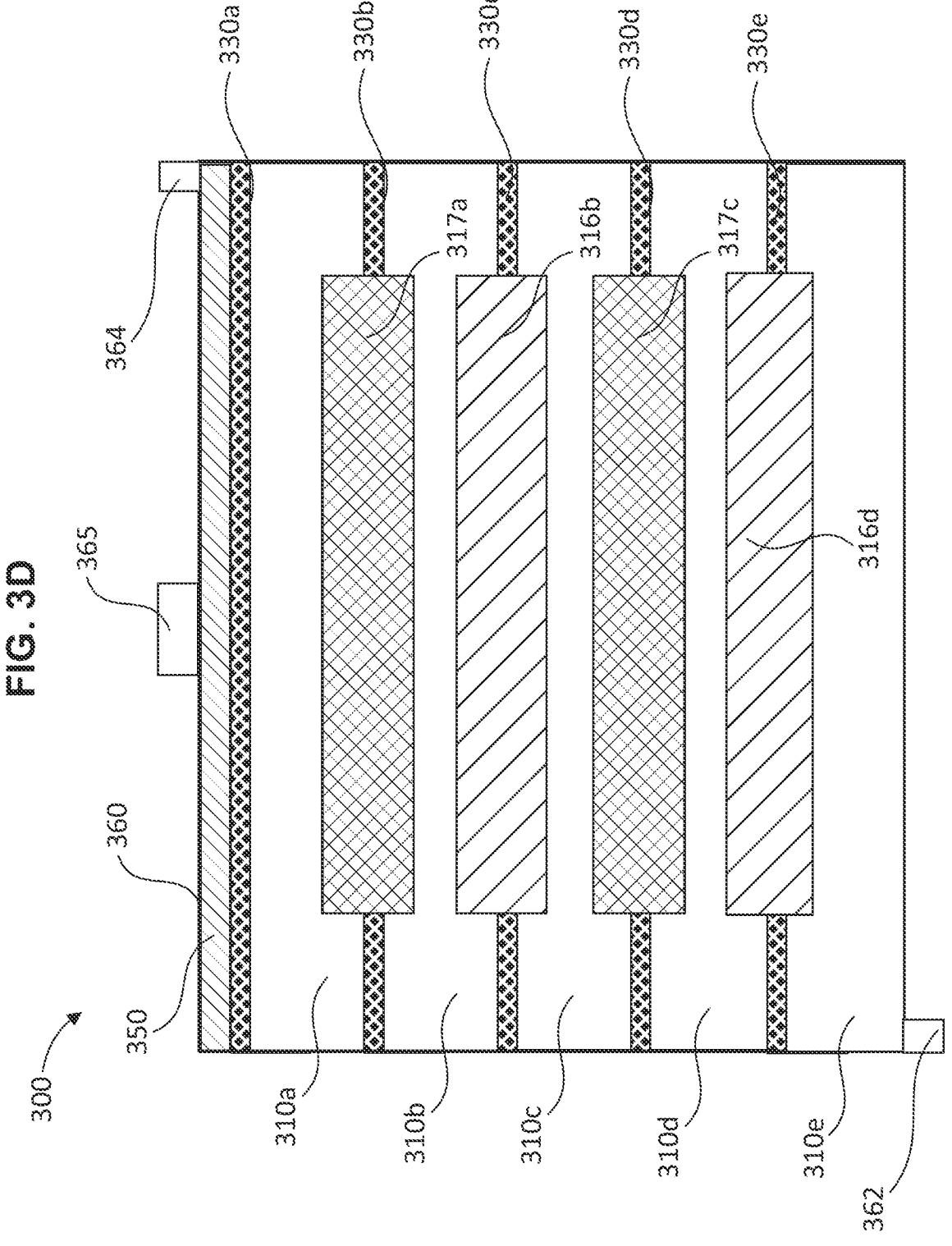
Figure 3E:
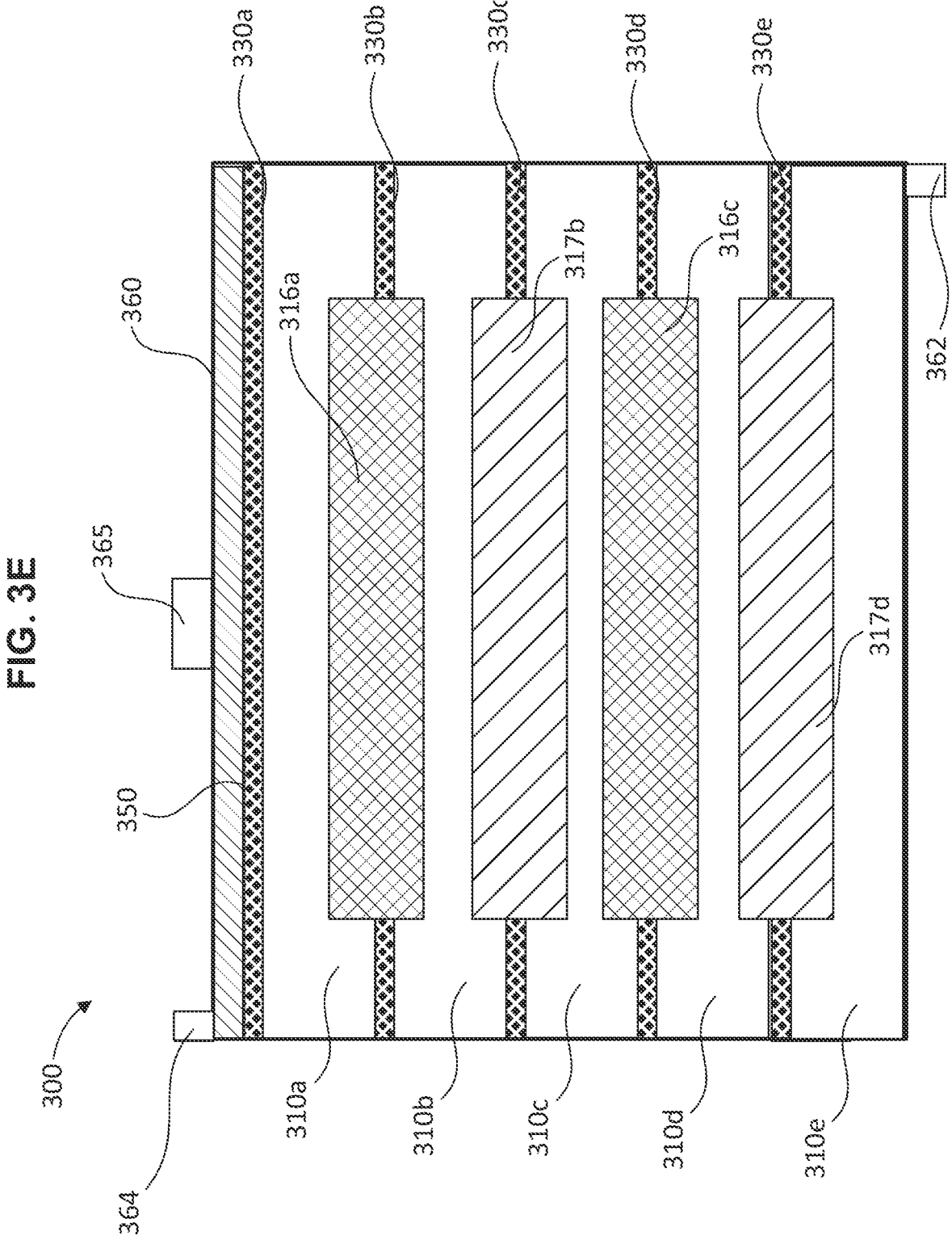
Figure 3F:
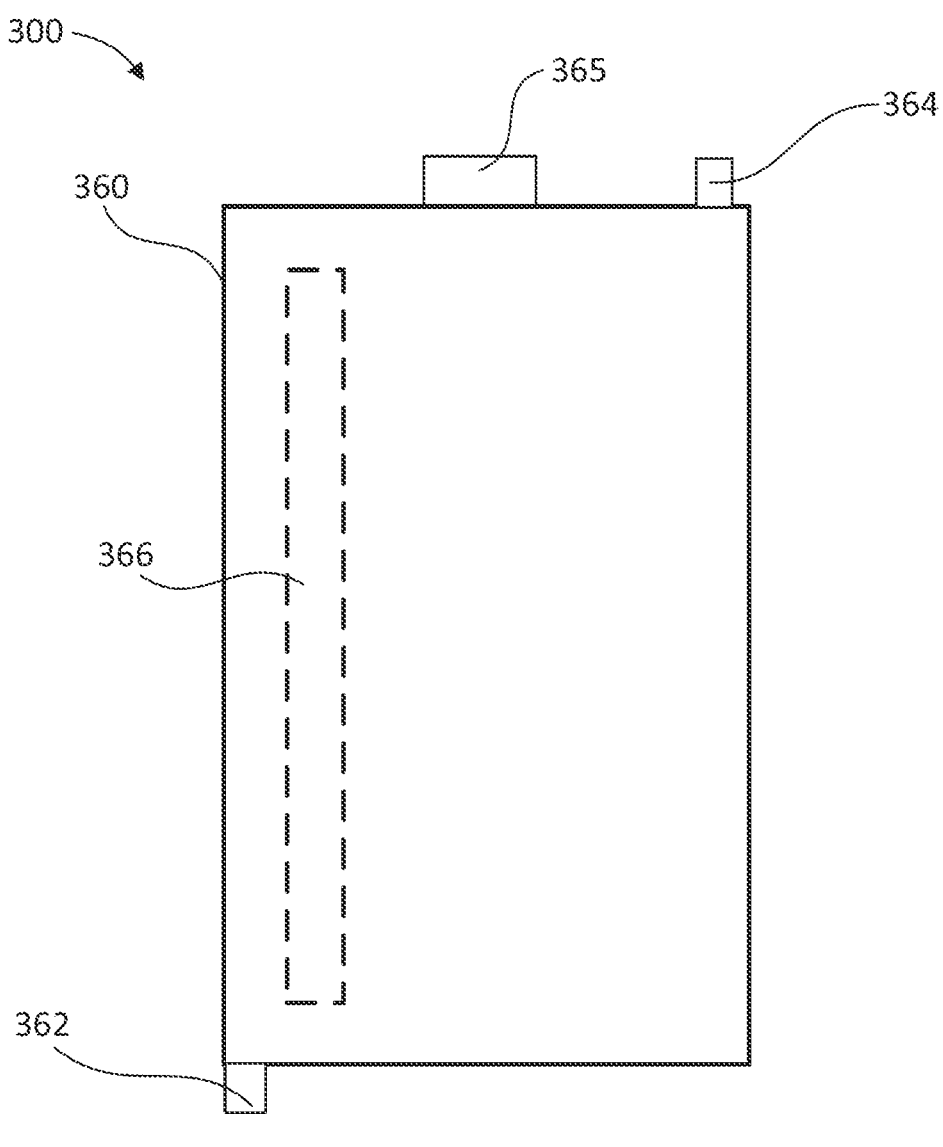

FIGS. 3A-3F show an electrochemical cell module 300, according to an embodiment. As shown, the electrochemical cell module 300 includes electrochemical cells 310a, 310b, 310c, 310d, 310e (collectively referred to as electrochemical cells 310), heat sinks 330a, 330b, 330c, 330d, 330e (collectively referred to as heat sinks 330), a pressure member 350, an external casing 360, and temperature sensors 370a, 370b, 370c, 370d, 370e (collectively referred to as temperature sensors 370). FIG. 3A shows a side view of the electrochemical cell module 300, while FIG. 3B shows a detailed view of a section B of the electrochemical cell 310c, while FIG. 3C shows a tab coupling scheme of an electrochemical cell 310. FIG. 3D shows a front view of the electrochemical cell module 300, FIG. 3E shows a back view of the electrochemical cell module 300, and FIG. 3F shows an external view of the external casing 360 of the electrochemical cell module 300. In some embodiments, the electrochemical cells 310, the heat sinks 330, the pressure member 350, and the external casing 360 can be the same or substantially similar to the electrochemical cells 110, the heat sink 130, the pressure member 150, and the external casing 360, as described above with reference to FIG. 1. Thus, certain aspects of the electrochemical cells 310, the heat sinks 330, the pressure member 350, and the external casing 360 are not described in greater detail herein.

As shown in FIGS. 3B and 3C, the electrochemical cells 310 include an anode material 311 disposed on an anode current collector 312, a cathode material 313 disposed on a cathode current collector 314, with a separator 315 disposed between the anode material 311 and the cathode material 313. The anode current collector 312 includes an anode tab 316 and the cathode current collector 314 includes a cathode tab 317. The electrochemical cells 310 also include a pouch material 318 disposed around the outside of the anode current collector 312 and the cathode current collector 314 to form a pouch. As shown, the separator 315, the cathode tab 317, and the pouch material 318 are folded at an angle with respect to the anode material 311 and the cathode material 313. In some embodiments, the anode tab 316 can be folded at an angle with respect to the anode material 311 and the cathode material 313. As shown, the separator 315, the cathode tab 317, and the pouch material 318 form an angle of approximately 90 degrees with respect to the lengthwise or widthwise dimension of the anode material 311 and the cathode material 313. In some embodiments, the separator 315, the anode tab 316, the cathode tab 317, and/or the pouch material 318 can form an angle of about 80 degrees, about 85 degrees, about 90 degrees, about 95 degrees, about 100 degrees, about 105 degrees, about 110 degrees, about 115 degrees, about 120 degrees, about 125 degrees, or about 130 degrees with respect to the lengthwise or widthwise dimension of the anode material 311 and the cathode material 313, inclusive of all values and ranges therebetween. In some embodiments, the separator 315, the anode tab 316, the cathode tab 317, and/or the pouch material 318 can be attached to the inner walls of the external casing 360 (e.g., via an adhesive).

The separator 315, the cathode tab 317, and the pouch material 318 are folded to minimize a distance between the external casing 360 and a leading edge of the anode material 311 and/or the cathode material 313. Minimizing this distance can minimize the amount of unused space in the electrochemical cell module 300. In some embodiments, the distance between the external casing 360 and the leading edge of the anode material 311 and/or the cathode material 313 can be less than about 2 mm, less than about 1.9 mm, less than about 1.8 mm, less than about 1.7 mm, less than about 1.6 mm, less than about 1.5 mm, less than about 1.4 mm, less than about 1.3 mm, less than about 1.2 mm, less than about 1.1 mm, less than about 1 mm, less than about 900 µm, less than about 800 µm, less than about 700 µm, less than about 600 µm, less than about 500 µm, less than about 400 µm, less than about 300 µm, less than about 200 µm, less than about 100 µm, less than about 90 µm, less than about 80 µm, less than about 70 µm, less than about 60 µm, less than about 50 µm, less than about 40 µm, less than about 30 µm, less than about 20 µm, or less than about 10 µm, inclusive of all values and ranges therebetween.

FIG. 3C shows a scheme coupling the electrochemical cell 310 to the external casing 360 via the anode tab 316 and the cathode tab 317. As shown, the cathode tab 317 is oriented, such that it folds upward with respect to the electrochemical cell 310, and the anode tab 316 is oriented, such that it folds downward with respect to the electrochemical cell 310. The anode tab 316 extends out of the electrochemical cell 310 in an opposite direction, compared to the cathode tab 317. This arrangement can correspond to cells connected in series. In some embodiments, the cathode tab 317 can extend out of the electrochemical cell 310 in the same direction as the anode tab 316. This arrangement can correspond to cells connected in parallel.

As shown, the external casing 360 includes a negative terminal 362, a positive terminal 364, and a communication device 365. The negative terminal 362 is electrically coupled to one or more anode tabs 316. In some embodiments, the anode tabs 316 can be coupled to a metal plate, and the metal plate can be coupled to the negative terminal 362. In some embodiments, the anode tabs 316 can be coupled directly to the inner wall of the external casing 360. In some embodiments, the coupling of the anode tabs 316 to the metal plate and/or the inner wall of the external casing 360 can be via welding. In some embodiments, the negative terminal 362 can be connected to a jumper tab. The positive terminal 364 is electrically coupled to one or more cathode tabs 317. In some embodiments, the cathode tabs 317 can be coupled to a metal plate and the metal plate can be coupled to the positive terminal 364. In some embodiments, the cathode tabs 317 can be coupled directly to the inner wall of the external casing 360. In some embodiments, the coupling of the cathode tabs 317 to the metal plate and/or the inner wall of the external casing 360 can be via welding. In some embodiments, the positive terminal 364 can be connected to a jumper tab.

The communication device 365 communicates information about the electrochemical cell module 300. In some embodiments, the communication device 365 can communicate to a user interface (e.g., a computer, a laptop computer, a desktop computer, a tablet, a mobile phone, or any other suitable device or combinations thereof). In some embodiments, the communication device 365 can communicate information about the state of charge of the electrochemical cells 310, temperature information from the temperature sensors 370, pressure information from inside the external case 360, and/or any other desired information. In some embodiments, the communication device 365 can include a battery management system (BMS). In some embodiments, the BMS can include a printed circuit board (PCB). In some embodiments, the temperature sensors 370 and/or the electrochemical cells 310 can be electrically coupled to the PCB.

FIG. 3D shows a front view of the electrochemical cell module 300 with the cathode tabs 317a, 317c and the anode tabs 316b, 316d visible. FIG. 3E shows a back view of the electrochemical cell module 300 with the anode tabs 316a, 316c and the cathode tabs 317b, 317d visible. As shown, the electrochemical cells 310 are arranged in series, as the anode tab 316 of a first electrochemical cell 310 is coupled to a cathode tab 317 of a second electrochemical cell 310.

FIG. 3F shows an exterior view of the external case 360 of the electrochemical cell module 300. As shown, the external case 360 includes a degassing aperture 366. Gases evolved during formation of the electrochemical cell module 300 can flow out of the external case 360 via the degassing aperture 366. During production of the electrochemical cell module 300, a portion of the heat sink 330 can be opened (e.g., pierced) to vent gas from the degas area in the electrochemical cells 310. Once the formation of the electrochemical cell module 300 is complete, the degassing aperture 366 can be covered and sealed. In some embodiments, the external casing 360 can be wrapped with a pouch or additional casing with a hermetic seal to insulate the electrochemical cell module 360. In some embodiments, the external casing 360 can be wrapped by an aluminum pouch. In some embodiments, the external casing 360 can be wrapped by an aluminum casing.

In some embodiments, the electrochemical cell module 300 can include one or more heating elements (not shown). In some embodiments, the heating elements can include heating strips. In some embodiments, the heating elements can be disposed between the electrochemical cells 310 (e.g., between the electrochemical cell 310a and the electrochemical cell 310b). The heating elements can aid in maintaining an elevated operating temperature. The heating elements can be beneficial for cell designs intended to operate at higher temperatures (e.g., at least about 25° C., at least about 30° C., at least about 35° C., at least about 40° C., at least about 45° C., or at least about 50° C.). In low-temperature environments (e.g., about −20° C.), the heating elements can elevate the operating temperature to at least about −15° C., at least about −10° C., at least about −5° C., at least about 0° C., at least about 5° C., at least about 10° C., at least about 15° C., or at least about 25° C. In some embodiments, the heating elements can be integrated into the heat sinks 330. In some embodiments, the heat sinks 330 can be used to transfer heat into the electrochemical cell module 300 and to draw heat away from the electrochemical cells 310 in the electrochemical cell module 300 as desired.

Figure 4A:
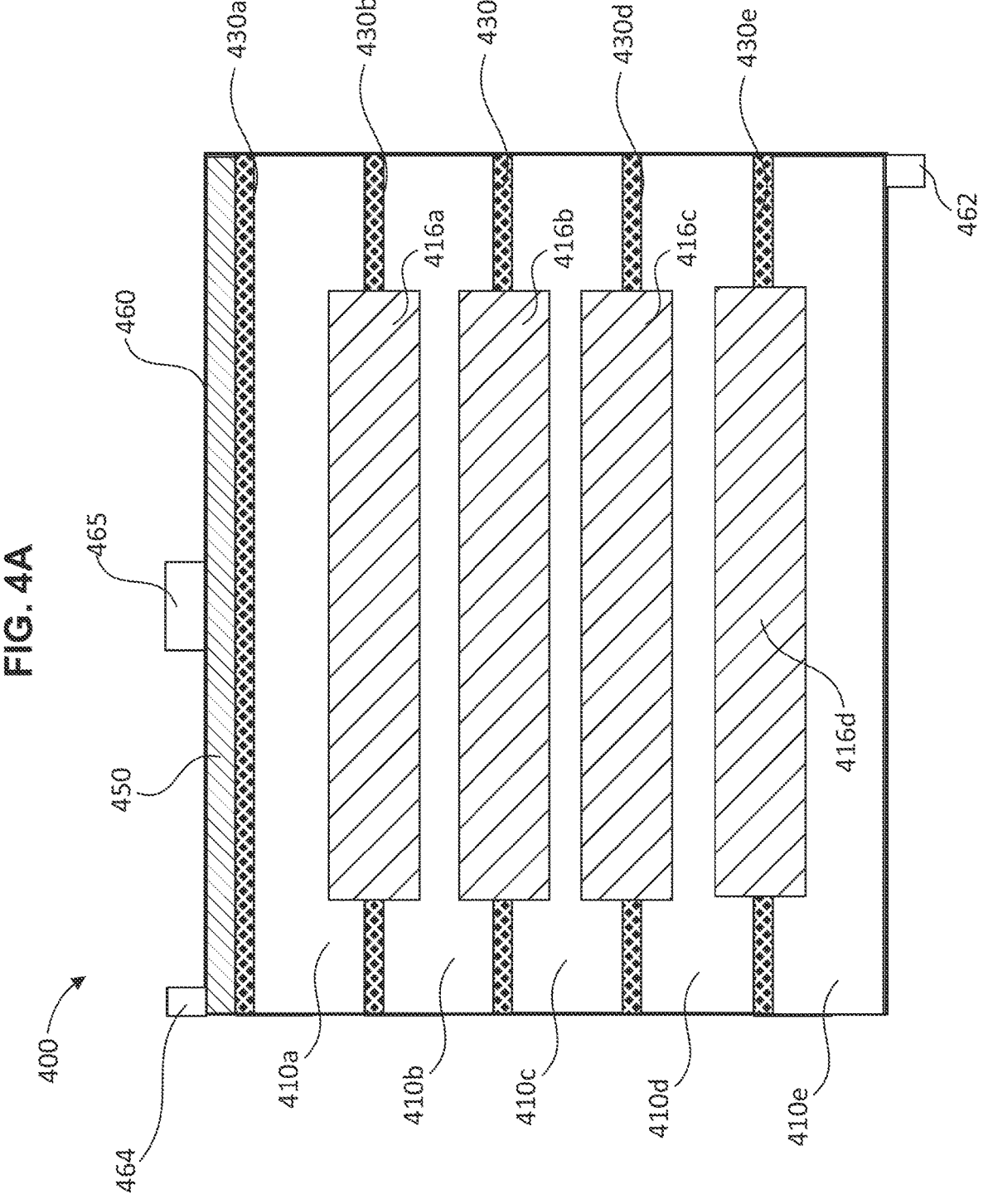
FIGS. 4A-4B are illustrations of an electrochemical cell module, according to an embodiment.
Figure 4B:
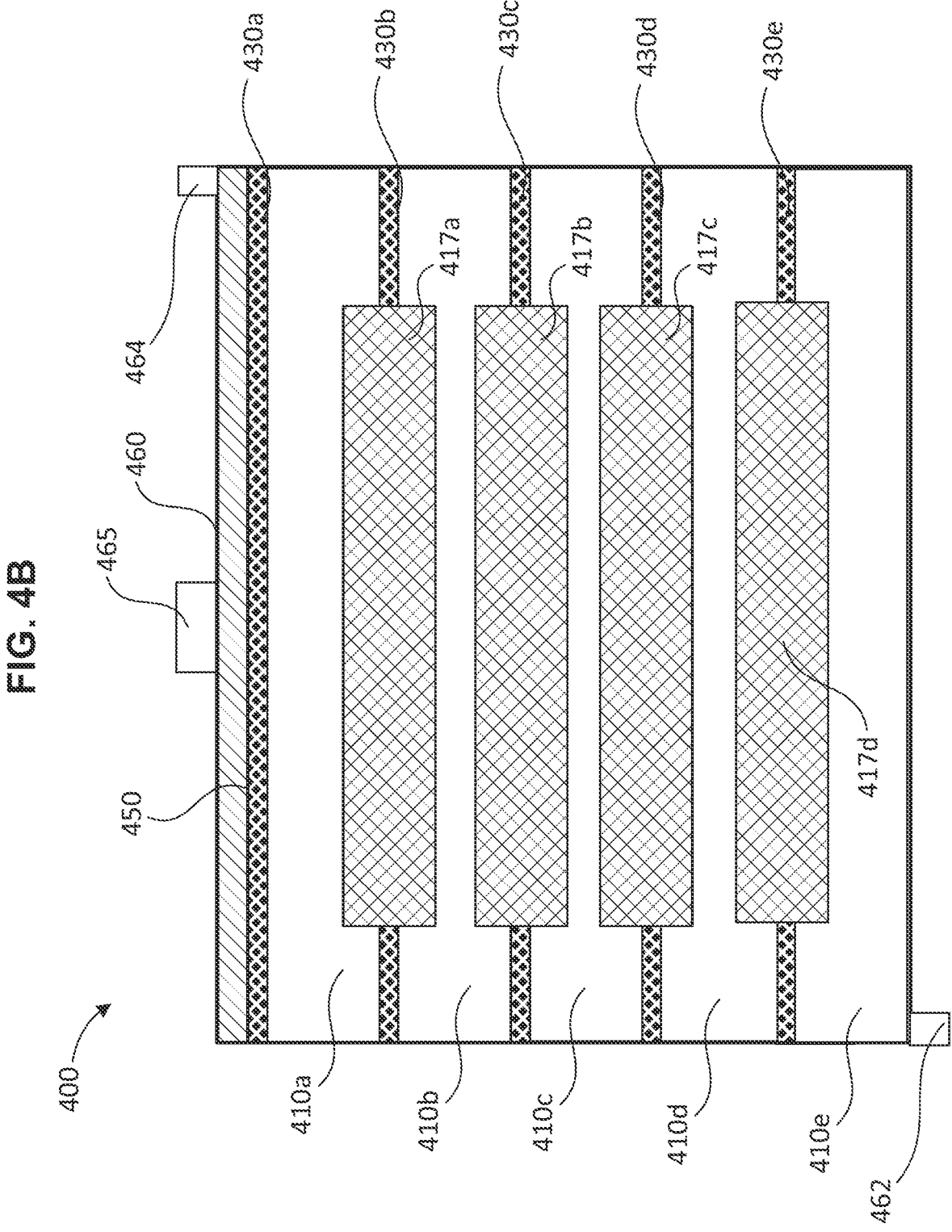

FIGS. 4A-4B show an electrochemical cell module 400, according to an embodiment. FIG. 4A shows a front view of the electrochemical cell module 400 while FIG. 4B shows a back view of the electrochemical cell module 400. As shown, the electrochemical cell module 400 includes electrochemical cells 410a, 410b, 410c, 410d, 410e (collectively referred to as electrochemical cells 410), heat sinks 430a, 430b, 430c, 430d, 430e (collectively referred to as heat sinks 430), a pressure member 450, and an external case 460. As shown, the electrochemical cells 410 include anode tabs 416a, 416b, 416c, 416d, (collectively referred to as anode tabs 416) and cathode tabs 417a, 417b, 417c, 417d (collectively referred to as cathode tabs 417). As shown, the external case 460 includes a negative terminal 462, a positive terminal 464, and a communication device 465.

In some embodiments, the electrochemical cells 410, anode tabs 416, the cathode tabs 417, the heat sinks 430, the pressure member 450, the external case 460, the negative terminal 462, the positive terminal 464, and the communication device 465 can be the same or substantially similar to the electrochemical cells 310, anode tabs 316, the cathode tabs 317, the heat sinks 330, the pressure member 350, the external case 360, the negative terminal 362, the positive terminal 364, and the communication device 365, as described above with reference to FIGS. 3A-3F. Thus, certain aspects of the electrochemical cells 410, anode tabs 416, the cathode tabs 417, the heat sinks 430, the pressure member 450, the external case 460, the negative terminal 462, the positive terminal 464, and the communication device 465 are not described in greater detail herein. As shown, the electrochemical cells 410 are connected in parallel. In other words, each of the anode tabs 416 are electrically coupled to one another while each of the cathode tabs 417 are electrically coupled to one another.

Figure 5A:
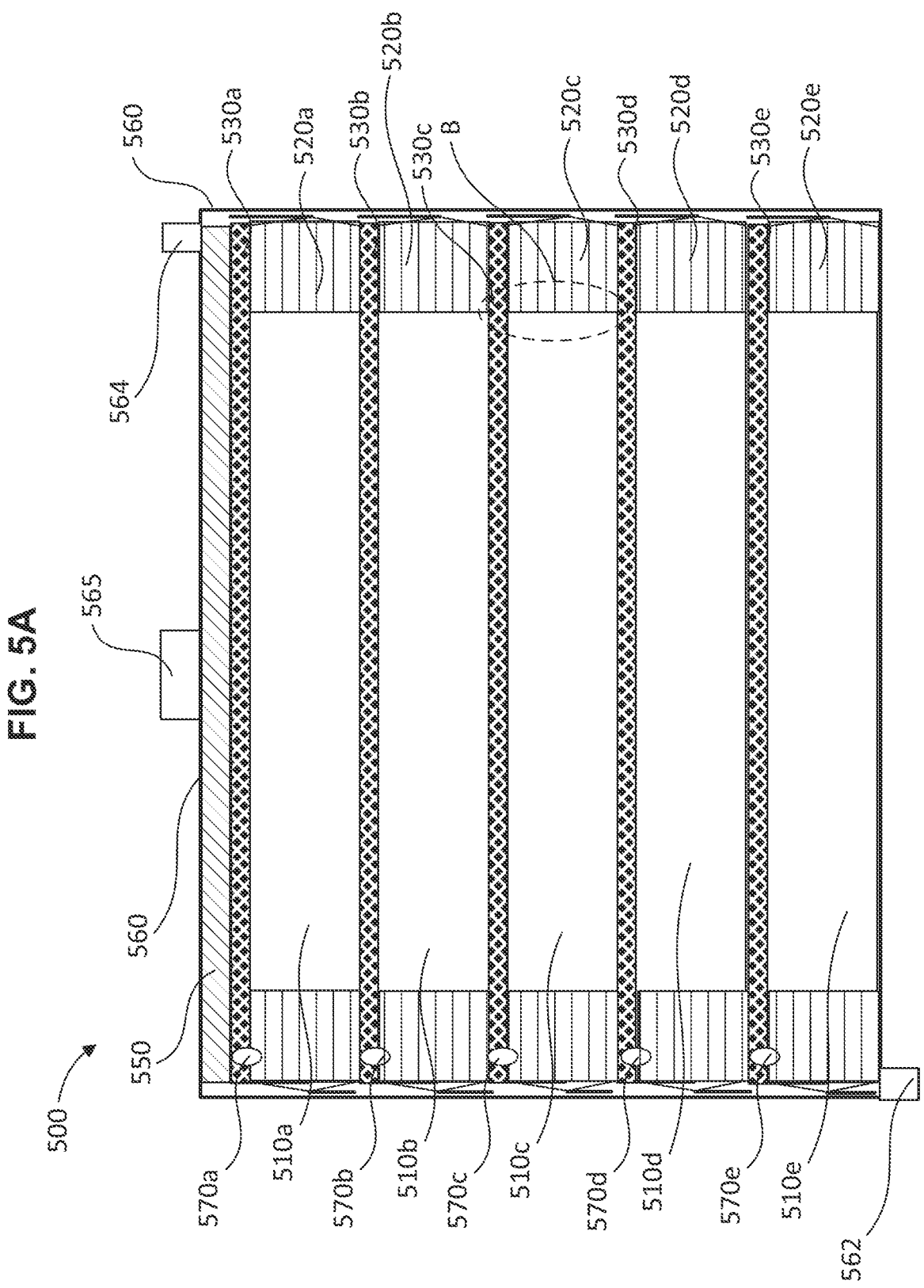
FIGS. 5A-5C are illustrations of an electrochemical cell module, according to an embodiment.
Figure 5B:
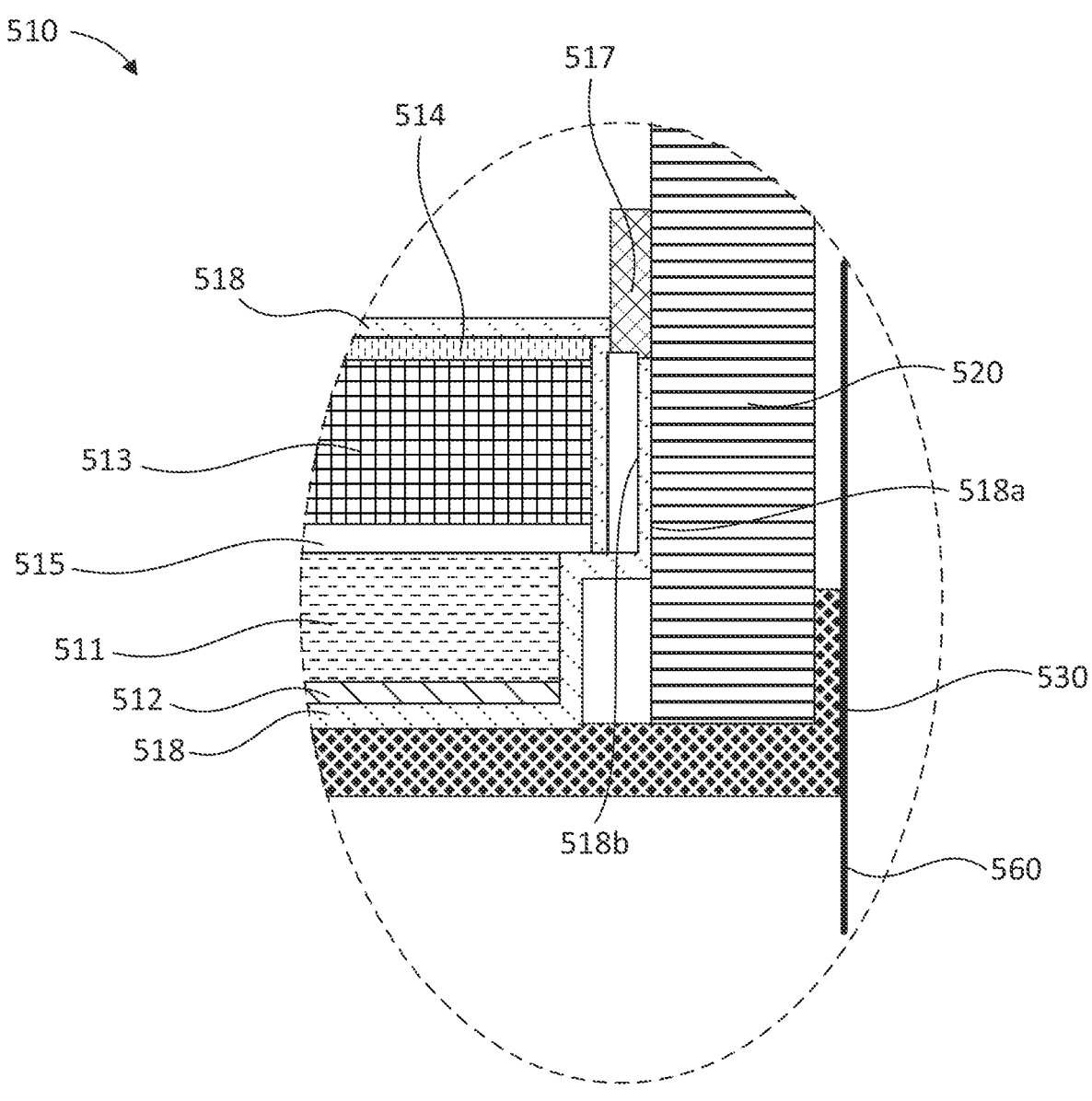
Figure 5C:
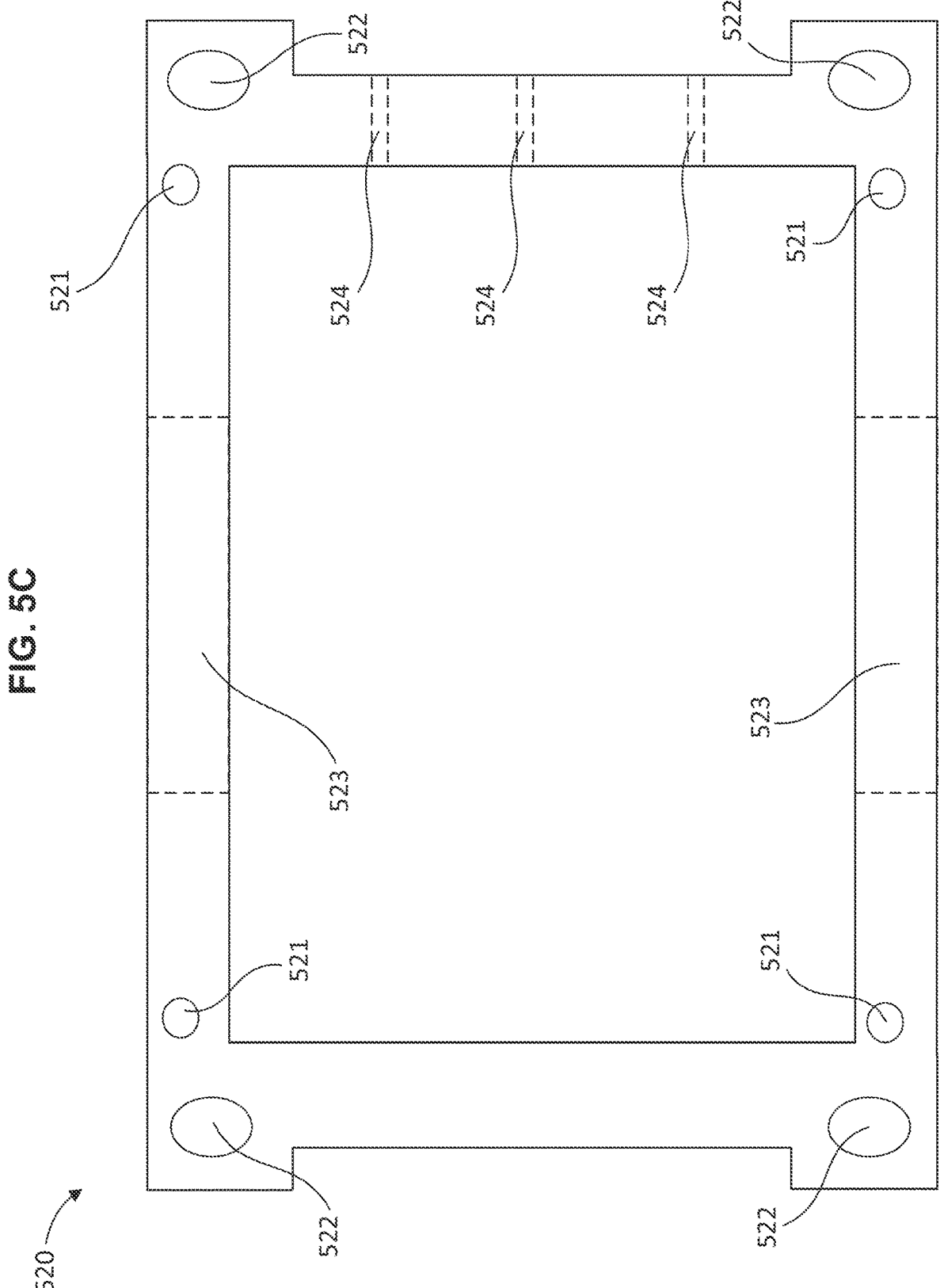

FIGS. 5A-5C show an electrochemical cell module 500, according to an embodiment. As shown, the electrochemical cell module 500 includes electrochemical cells 510a, 510b, 510c, 510d, 510e (collectively referred to as electrochemical cells 510), frames 520a, 520b, 520c, 520d, 520e (collectively referred to as frames 520), heat sinks 530a, 530b, 530c, 530d, 530e (collectively referred as heat sinks 530), a pressure member 550, an external casing 560, and temperature sensors 570a, 570b, 570c, 570d, 570e (collectively referred to as temperature sensors 570). FIG. 5A shows a side view of the electrochemical cell module 500, while FIG. 5B shows a detailed view of a section B of the electrochemical cell 510c. FIG. 5C shows a detailed view of a frame 520. As shown, the electrochemical cells 510 each include an anode material 511, an anode current collector 512, a cathode material 513, a cathode current collector 514, a separator 515, an anode tab (not shown), a cathode tab 517, and a pouch material 518. As shown, the external casing 560 includes a negative terminal 562, a positive terminal 564, and a communication device 565.

In some embodiments, the electrochemical cells 510, the anode material 511, the anode current collector 512, the cathode material 513, the cathode current collector 514, the separator 515, the anode tab, the cathode tab 517, the pouch material 518, the heat sinks 530, the pressure member 550, the external casing 560, the negative terminal 562, the positive terminal 564, the communication device 565, and the temperature sensors 570 can be the same or substantially similar to the electrochemical cells 310, the anode material 311, the anode current collector 312, the cathode material 313, the cathode current collector 314, the separator 315, the anode tab 316, the cathode tab 317, the pouch material 318, the heat sinks 330, the pressure member 350, the external casing 360, the negative terminal 362, the positive terminal 364, the communication device 365, and the temperature sensors 370, as described above with reference to FIGS. 3A-3F. Thus, certain aspects of the electrochemical cells 510, the anode material 511, the anode current collector 512, the cathode material 513, the cathode current collector 514, the separator 515, the anode tab, the cathode tab 517, the pouch material 518, the heat sinks 530, the pressure member 550, the external casing 560, the negative terminal 562, the positive terminal 564, the communication device 565, and the temperature sensors 570 are not described in greater detail herein.

As shown in FIG. 5B, the separator 515, the cathode tab 517, and the pouch material 518 are folded at an angle with respect to the anode material 511 and the cathode material 513. In some embodiments, the anode tab can be folded at an angle with respect to the anode material 511 and the cathode material 513. As shown, the separator 515, the cathode tab 517, and the pouch material 518 form an angle of approximately 90 degrees with respect to the lengthwise or widthwise dimension of the anode material 511 and the cathode material 513. In some embodiments, the separator 515, the anode tab 516, the cathode tab 517, and/or the pouch material 518 can form an angle of about 80 degrees, about 85 degrees, about 90 degrees, about 95 degrees, about 100 degrees, about 105 degrees, about 110 degrees, about 115 degrees, about 120 degrees, about 125 degrees, or about 130 degrees with respect to the lengthwise or widthwise dimension of the anode material 511 and the cathode material 513, inclusive of all values and ranges therebetween.

The separator 515, the cathode tab 517, and the pouch material 518 are folded to minimize a distance between an inner surface of the frame 520 and a leading edge of the anode material 511 and/or the cathode material 513. Minimizing this distance can minimize the amount of unused space in the electrochemical cell module 500. In some embodiments, the distance between the frame 520 and the leading edge of the anode material 511 and/or the cathode material 513 can be less than about 2 mm, less than about 1.9 mm, less than about 1.8 mm, less than about 1.7 mm, less than about 1.6 mm, less than about 1.5 mm, less than about 1.4 mm, less than about 1.3 mm, less than about 1.2 mm, less than about 1.1 mm, less than about 1 mm, less than about 900 μm, less than about 800 μm, less than about 700 μm, less than about 600 μm, less than about 500 μm, less than about 400 μm, less than about 300 μm, less than about 200 μm, less than about 100 μm, less than about 90 μm, less than about 80 μm, less than about 70 μm, less than about 60 μm, less than about 50 μm, less than about 40 μm, less than about 30 μm, less than about 20 μm, or less than about 10 μm, inclusive of all values and ranges therebetween. In some embodiments, the cathode tab 517 can be welded to the frame 520. In some embodiments, the anode tab can be welded to the frame 520. In some embodiments, the frame 520 can be welded to the inner wall of the external casing 560.

As shown in FIG. 5B, a bottom surface 518a of the portion of the pouch material 518 that extends beyond the anode material 511 and the cathode material 513 contacts the frame 520. In some embodiments, the bottom surface of the portion of the pouch material 518 that extends beyond the anode material 511 and the cathode material 513 can contact an inner wall of the external casing 560. In some embodiments, a top surface 518*b* of the portion of the pouch material 518 that extends beyond the anode material 511 and the cathode material 513 can contact the frame 520. In some embodiments, the top surface of the portion of the pouch material 518 that extends beyond the anode material 511 and the cathode material 513 can contact the external casing 560. As shown, a bottom surface 518*a* of the cathode tab 517 contacts the frame 520. In some embodiments, a top surface 518*b* of the cathode tab 517 can contact the frame 520. In some embodiments, the bottom surface of the cathode tab 517 can contact the inner wall of the external casing 560. In some embodiments, the top surface of the cathode tab 517 can contact the inner wall of the external casing 560. In some embodiments, a bottom surface 518*a* of the anode tab 516 contacts the frame 520. In some embodiments, a top surface 518*b* of the anode tab 516 can contact the frame 520. In some embodiments, the bottom surface of the anode tab 516 can contact the inner wall of the external casing 560. In some embodiments, the top surface of the anode tab 516 can contact the inner wall of the external casing 560.

As shown in FIGS. 5A and 5B, the pouch material 518 folds in a first direction on a first side of the electrochemical cell module 500 and a second direction on a second side of the electrochemical cell module 500, the second side opposite the first side. In some embodiments, the pouch material 518 on the first side can form an angle with the pouch material 518 on the second side of at least about 150 degrees, at least about 155 degrees, at least about 160 degrees, at least about 165 degrees, at least about 170 degrees, at least about 175 degrees, at least about 180 degrees, at least about 185 degrees, at least about 190 degrees, at least about 195 degrees, at least about 200 degrees, or at least about 205 degrees. In some embodiments, the pouch material 518 on the first side can form an angle with the pouch material 518 on the second side of no more than about 210 degrees, no more than about 205 degrees, no more than about 200 degrees, no more than about 195 degrees, no more than about 190 degrees, no more than about 185 degrees, no more than about 180 degrees, no more than about 175 degrees, no more than about 170 degrees, no more than about 165 degrees, no more than about 160 degrees, or no more than about 155 degrees. Combinations of the above-referenced angles are also possible (e.g., at least about 150 degrees and no more than about 210 degrees or at least about 160 degrees and no more than about 200 degrees), inclusive of all values and ranges therebetween. In some embodiments, the pouch material 518 on the first side can form an angle with the pouch material 518 on the second side of about 150 degrees, about 155 degrees, about 160 degrees, about 165 degrees, about 170 degrees, about 175 degrees, about 180 degrees, about 185 degrees, about 190 degrees, about 195 degrees, about 200 degrees, about 205 degrees, or about 210 degrees.

FIG. 5C shows detail of one of the frames 520. As shown, the frame 520 includes coupling pegs 521, attachment holes 522, tab passages 523, and a vent hole 524. In some embodiments, multiple frames 520 can be stacked on top of one another. In some embodiments, the coupling pegs 521 can aid in coupling one of the frames 520 to another. The coupling pegs 521 from a first frame can fit into a cavity on the underside of the coupling pegs 521 from a second frame. The attachment holes 522 can allow for the heat sinks 530 and/or the pressure plate 550 to couple to the frames 520

(e.g., via bolts or screws). The tab passages 523 are thinned portions of the frame 520, through which tabs (e.g., anode tabs 516 and/or cathode tabs 517) can pass to connect to adjacent cells. In some embodiments, the tab passages 523 can include insulation material if the frame 520 is metallic. The vent hole 524 allows for degassing during production of the electrochemical cell module 500. After production of the electrochemical cell module 500 is complete, the vent hole 524 can be filled (e.g., by a metal). In some embodiments, the frame can be constructed such that the vent hole 524 aligns or approximately aligns with one or more vent holes in the pouch material of the electrochemical cells 510. In some embodiments, the vent holes in the pouch material of the electrochemical cells 510 can be the same or substantially similar to the vent holes 219, as described above with reference to FIGS. 2A-2B.

Figure 6:
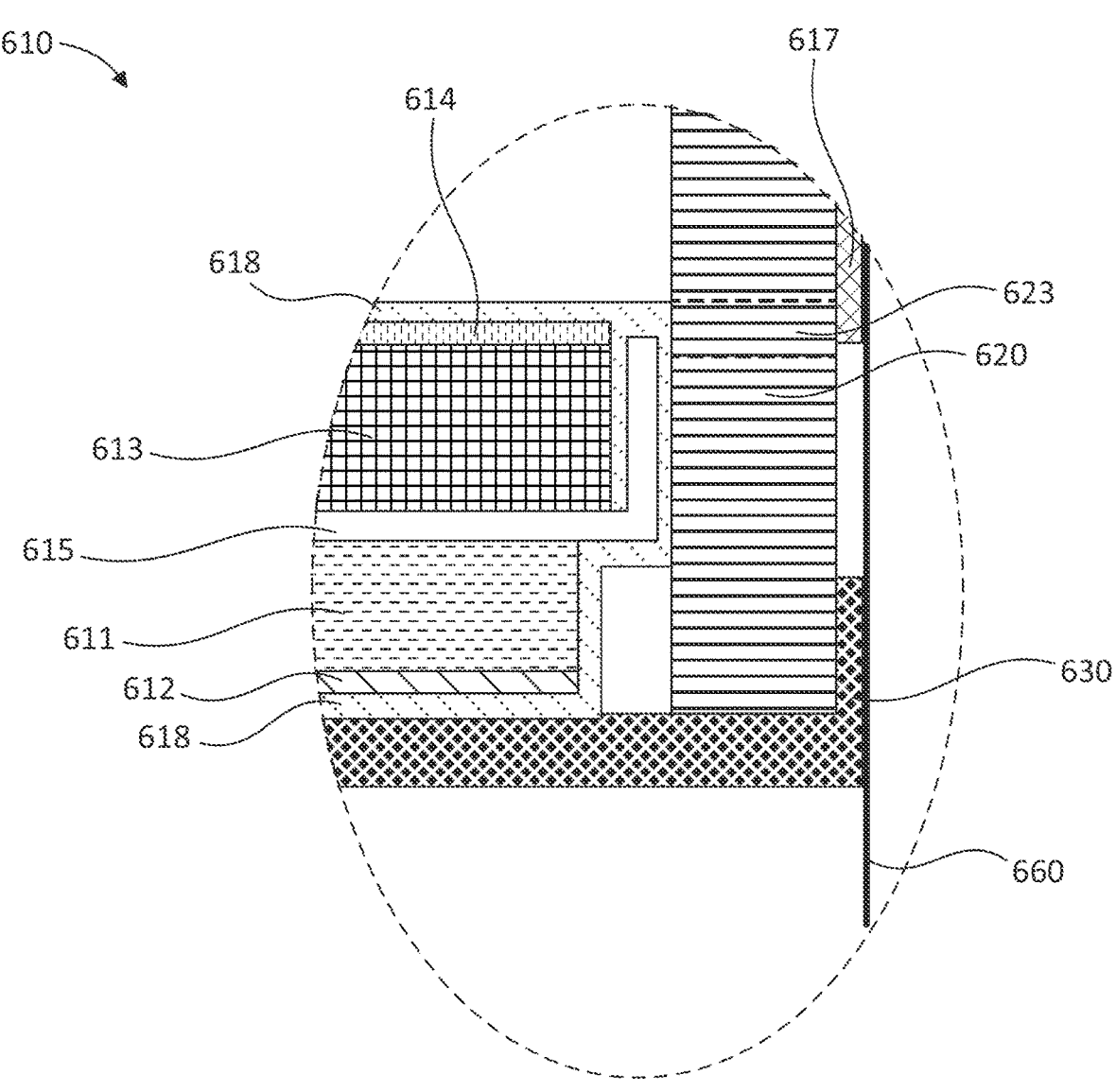
FIG. 6 is an illustration of an electrochemical cell, according to an embodiment.

FIG. 6 is an illustration of an electrochemical cell 610, according to an embodiment. As shown, the electrochemical cell 610 includes an anode material 611, an anode current collector 612, a cathode material 613, a cathode current collector 614, a separator 615, an anode tab (not shown), a cathode tab 617, and a pouch material 618. The electrochemical cell 610 contacts a framing member 620 and a heat sink, and the electrochemical cell 610 the framing member 620, and the heat sink 630 are housed inside an external casing 660. In some embodiments, the anode material 611, the anode current collector 612, the cathode material 613, the cathode current collector 614, the separator 615, the anode tab, the cathode tab 617, the pouch material 618, the heat sink 630, and the external casing 660 can be the same or substantially similar to the anode material 511, the anode current collector 512, the cathode material 513, the cathode current collector 514, the separator 515, the anode tab, the cathode tab 517, the pouch material 518, the external casing 560, and the as described above with reference to FIGS. 5A-5C. Thus, certain aspects of the anode material 611, the anode current collector 612, the cathode material 613, the cathode current collector 614, the separator 615, the anode tab, the cathode tab 617, the pouch material 618, the heat sink 630, and the external casing 660 are not described in greater detail herein.

As shown, the cathode tab 617 extends through the framing member 620 via a tab passage 623 and contacts the inner wall of the external casing 660. In some embodiments, the tab passage 623 can be the same or substantially similar to the tab passage 523, as described above with reference to FIGS. 5A-5C. In some embodiments, the cathode tab 617 can be welded to the inner wall of the external casing 660. In some embodiments, the cathode tab 617 can be welded to a metal bar (not shown) electrically coupled to a positive terminal (not shown). Similarly, the anode tab can extend through the framing member 620 via a tab passage 623 and contacts the inner wall of the external casing 660. In some embodiments, the anode tab can be welded to a metal bar (not shown) electrically coupled to a positive terminal.

Figure 7A:
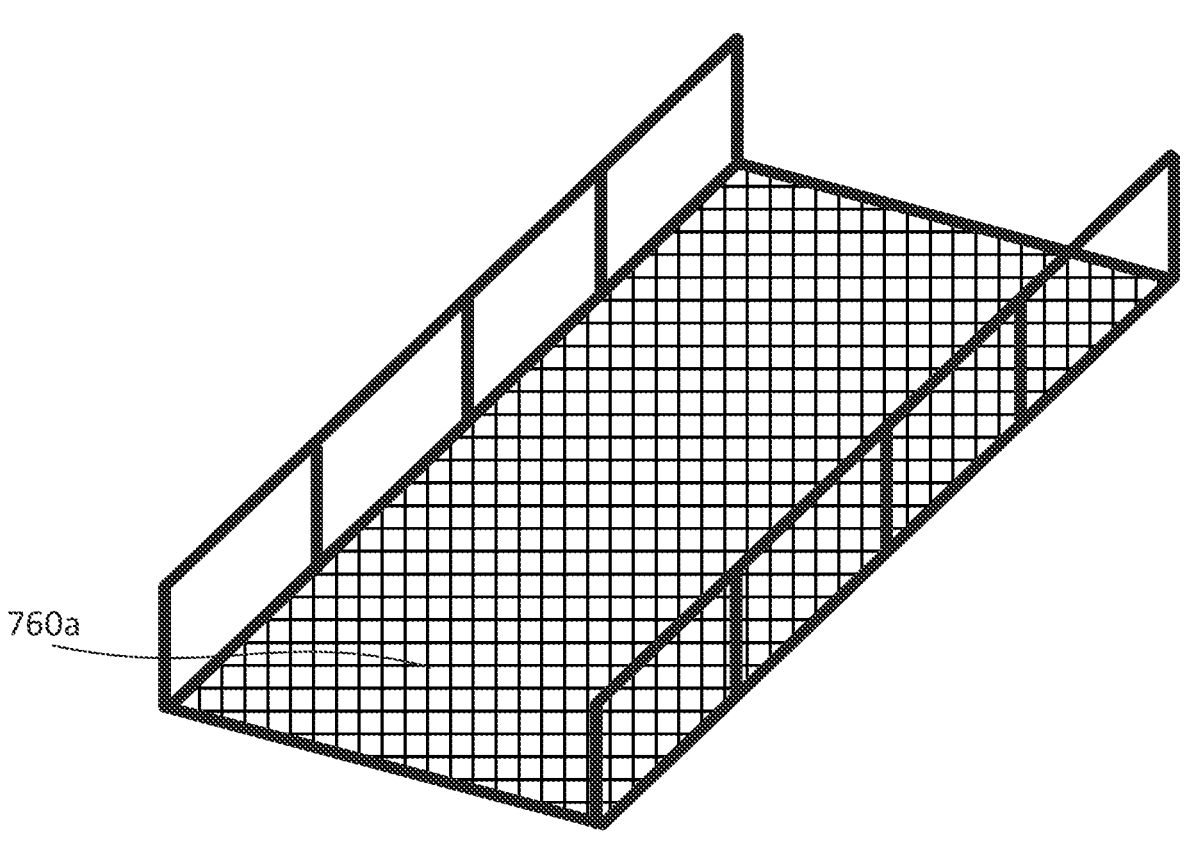

FIGS. 7A-7E are illustrations of a method of forming an electrochemical cell module 700, according to an embodiment. FIG. 7A shows an auxiliary view of a bottom casing 760*a*. FIG. 7B shows a stack of electrochemical cells 710 with pouch material 718 extending from the electrochemical cells 710. In FIG. 7B, the electrochemical cells 710 are shown above the bottom casing 760*a* and lowered into the bottom casing 760*a*. FIG. 7C shows the stack of electrochemical cells 710 resting in the bottom casing 760*a*, such that the walls of the bottom casing 760*a* cause the pouch material 718 to fold upward. In FIG. 7D, a top casing 760*b* is shown above the bottom casing 760*a* and the electrochemical cells 710. The top casing 760*b* is lowered onto the bottom casing 760*a*, such that the top casing 760*b* and the bottom casing 760*a* fit together. As shown, the top casing 760*b* is smaller than the bottom casing 760*a*, such that the top casing 760*b* fits inside the bottom casing 760*a* and causes further folds in the pouch material. In some embodiments, the top casing 760*b* can be larger than the bottom casing 760*a*, such that the top casing 760*b* fits around the outside of the bottom casing 760*a*. FIG. 7E shows the fully formed electrochemical cell module 700.

In some embodiments, the bottom casing 760*a* and/or the top casing 760*b* can be rigid and non-flexible. In some embodiments, the bottom casing 760*a* and/or the top casing 760*b* can be composed of high-density polyethylene (HDPE), polypropylene (PP), or any other suitable casing material. In some embodiments, the bottom casing 760*a* and/or the top casing 760*b* can have a thickness of at least about 100 μm, at least about 200 μm, at least about 300 μm, at least about 400 μm, at least about 500 μm, at least about 600 μm, at least about 700 μm, at least about 800 μm, at least about 900 μm, at least about 1 mm, at least about 1.5 mm, at least about 2 mm, at least about 2.5 mm, at least about 3 mm, at least about 3.5 mm, at least about 4 mm, or at least about 4.5 mm. In some embodiments, the bottom casing 760*a* and/or the top casing 760*b* can have a thickness of no more than about 5 mm, no more than about 4.5 mm, no more than about 4 mm, no more than about 3.5 mm, no more than about 3 mm, no more than about 2.5 mm, no more than about 2 mm, no more than about 1.5 mm, no more than about 1 mm, no more than about 900 μm, no more than about 800 μm, no more than about 700 μm, no more than about 600 μm, no more than about 500 μm, no more than about 400 μm, no more than about 300 μm, or no more than about 200 μm. Combinations of the above-referenced thicknesses are also possible (e.g., at least about 100 μm and no more than about 5 mm or at least about 500 μm and no more than about 1.5 mm), inclusive of all values and ranges therebetween. In some embodiments, the bottom casing 760*a* and/or the top casing 760*b* can have a thickness of about 100 μm, about 200 μm, about 300 μm, about 400 μm, about 500 μm, about 600 μm, about 700 μm, about 800 μm, about 900 μm, about 1 mm, about 1.5 mm, about 2 mm, about 2.5 mm, about 3 mm, about 3.5 mm, about 4 mm, about 4.5 mm, or about 5 mm.

Figure 8A:
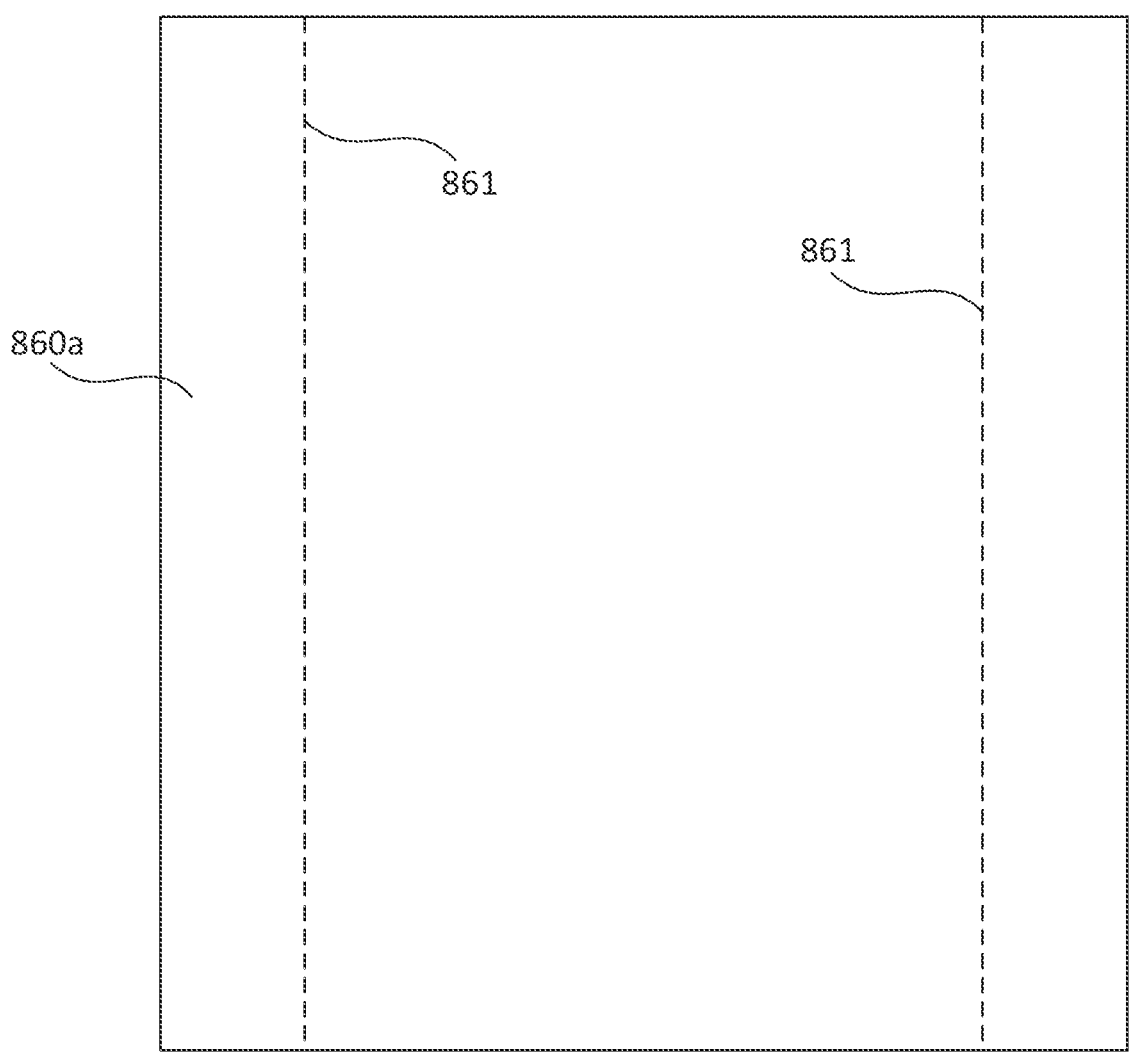
FIGS. 8A-8E are illustrations of a method of forming an electrochemical cell module, according to an embodiment.
Figure 8B:
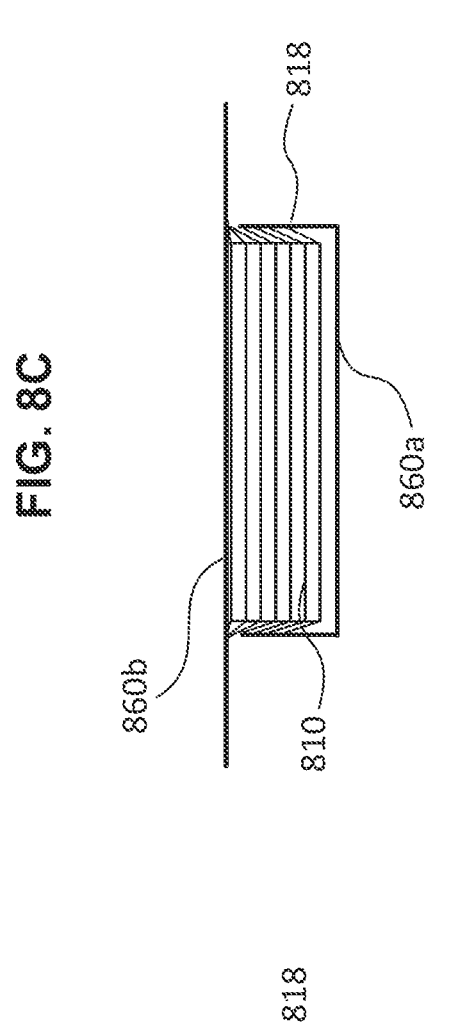
Figure 8C:
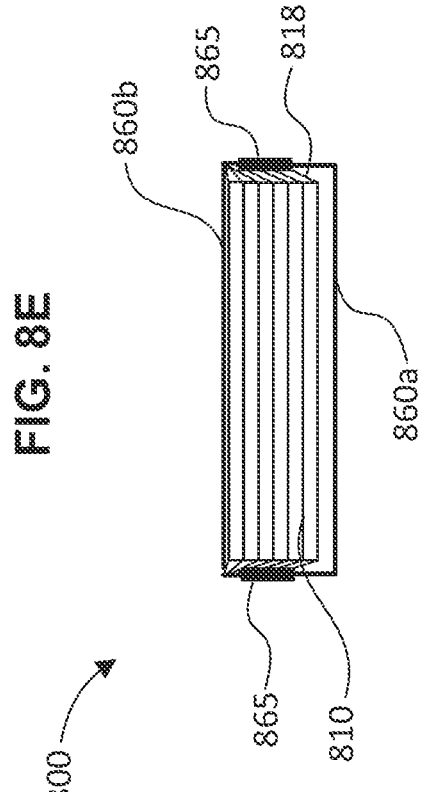
Figure 8D:
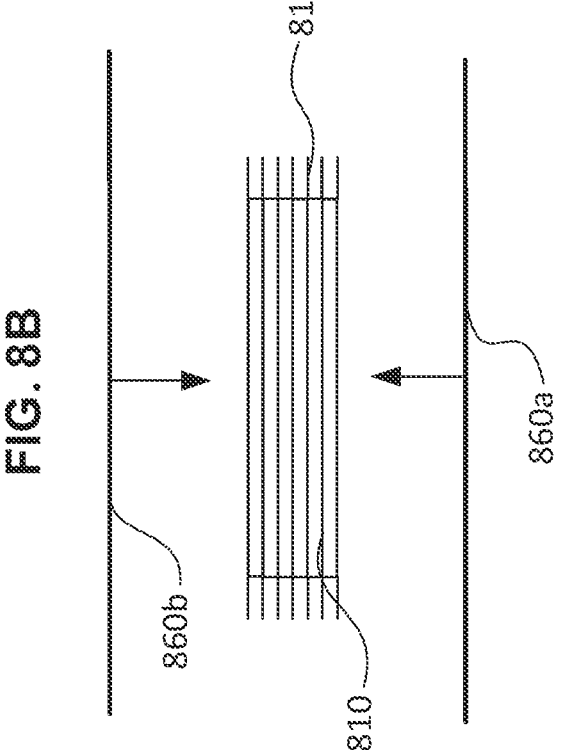
Figure 8E:
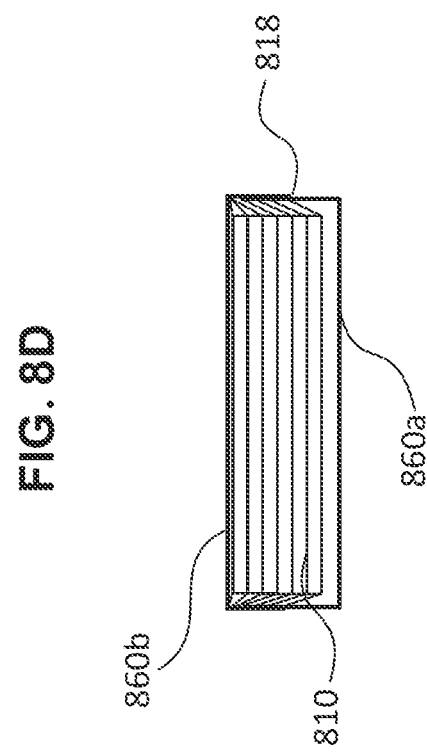

FIGS. 8A-8E are illustrations of a method of forming an electrochemical cell module 800, according to an embodiment. FIG. 8A shows a plan view of a bottom casing sheet 860*a*. As shown, the bottom casing sheet 860*a* includes perforation lines 861 for folding. FIG. 8B shows a stack of electrochemical cells 810 with pouch material 818 extending from the electrochemical cells. The bottom casing sheet 860*a* is placed below the electrochemical cells 810, while a top casing sheet 860*b* is placed above the electrochemical cells 810. The bottom casing sheet 860*a* and the top casing sheet 860*b* are moved toward the stack of electrochemical cells 810. In some embodiments, the bottom casing sheet 860*a* and the top casing sheet 860*b* can be moved toward the stack of electrochemical cells 810 at the same time. In some embodiments, the bottom casing sheet 860*a* and the top casing sheet 860*b* can be moved toward the stack of electrochemical cells 810 at different times. FIG. 8C shows the bottom casing sheet 860*a* folded (i.e., along the perforation lines 861), such that the bottom casing sheet 860*a* causes the pouch material 818 to fold. In FIG. 8D, the top casing sheet 860*b* is folded over, such that the top casing sheet 860*b* contacts the bottom casing sheet 860*a* and contains the electrochemical cells 810. In FIG. 8E, the bottom casing sheet 860*a* and the top casing sheet 860*b* are bonded together in bonding regions 865 to form the electrochemical cell module 800. In some embodiments, the bottom casing sheet 860*a* and the top casing sheet 860*b* can be bonded together via tape, adhesive, ultrasonic welding, or any other suitable bonding method, or combinations thereof.

In some embodiments, the bottom casing sheet 860*a* and/or the top casing sheet 860*b* can be composed of a flexible material. In some embodiments, the bottom casing sheet 860*a* and/or the top casing sheet 860*b* can be composed of polyethylene terephthalate (PET) or any other suitable flexible material. In some embodiments, the bottom casing sheet 860*a* and/or the top casing sheet 860*b* can have a thickness of at least about 50 μm, at least about 100 μm, at least about 150 μm, at least about 200 μm, at least about 250 μm, at least about 300 μm, at least about 350 μm, at least about 400 μm, at least about 450 μm, at least about 500 μm, at least about 550 μm, at least about 600 μm, at least about 650 μm, at least about 700 μm, at least about 750 μm, at least about 800 μm, at least about 850 μm, at least about 900 μm, or at least about 950 μm. In some embodiments, the bottom casing sheet 860*a* and/or the top casing sheet 860*b* can have a thickness of no more than about 1 mm, no more than about 950 μm, no more than about 900 μm, no more than about 850 μm, no more than about 800 μm, no more than about 750 μm, no more than about 700 μm, no more than about 650 μm, no more than about 600 μm, no more than about 550 μm, no more than about 500 μm, no more than about 450 μm, no more than about 400 μm, no more than about 350 μm, no more than about 300 μm, no more than about 250 μm, no more than about 200 μm, no more than about 150 μm, or no more than about 100 μm. Combinations of the above-referenced thicknesses are also possible (e.g., at least about 50 μm and no more than about 1 mm or at least about 100 μm and no more than about 400 μm), inclusive of all values and ranges therebetween. In some embodiments, the bottom casing sheet 860*a* and/or the top casing sheet 860*b* can have a thickness of about 50 μm, about 100 μm, about 150 μm, about 200 μm, about 250 μm, about 300 μm, about 350 μm, about 400 μm, about 450 μm, about 500 μm, about 550 μm, about 600 μm, about 650 μm, about 700 μm, about 750 μm, about 800 μm, about 850 μm, about 900 μm, about 950 μm, or about 1 mm.

FIGS. 9A-9E are illustrations of a method of forming an electrochemical cell module 900, according to an embodiment. As shown, the electrochemical cell module 900 includes a plurality of electrochemical cells 910, pouch material 918 extending from the electrochemical cells 910. In some embodiments, the electrochemical cells 910 and the pouch material 918 can be the same or substantially similar to the electrochemical cells 810 and the pouch material 818, as described above with reference to FIGS. 8A-8E. Thus, certain aspects of the electrochemical cells 910 and the pouch material 918 are not described in greater detail herein.

Figure 9A:
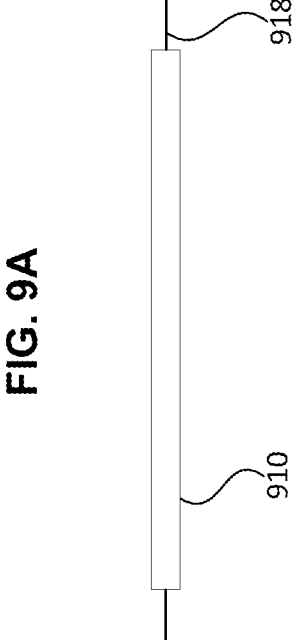
FIGS. 9A-9E are illustrations of a method of forming an electrochemical cell module, according to an embodiment.
Figure 9B:
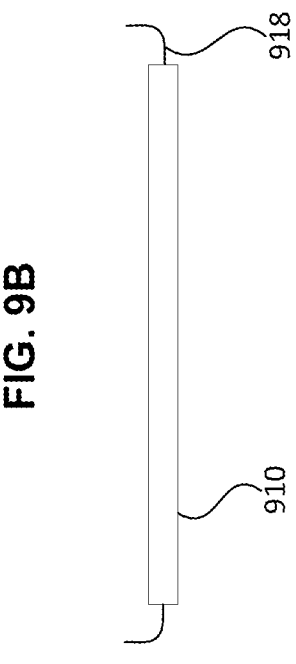
Figure 9B:
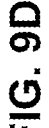
Figure 9C:
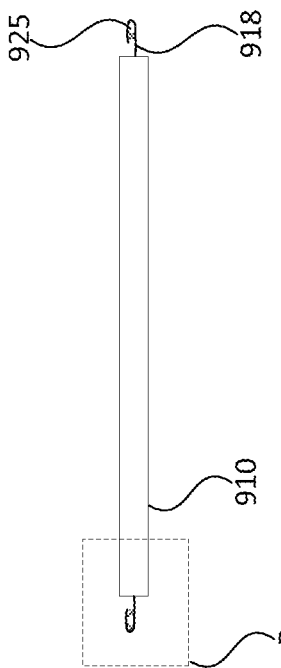
Figure 9D:
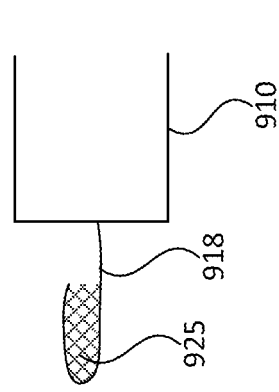
Figure 9E:
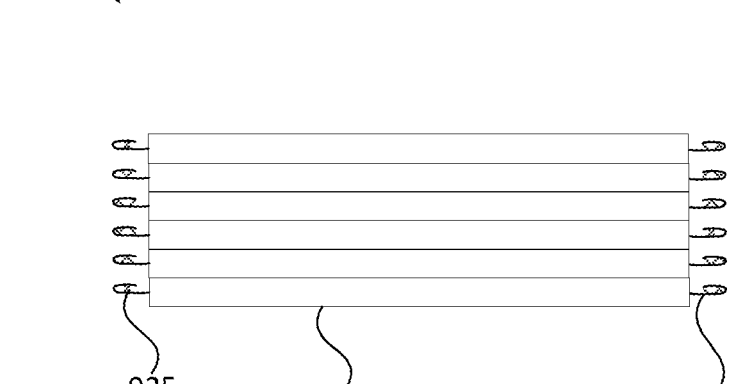

FIG. 9A shows a single electrochemical cell 910 with the pouch material 918 extending from the electrochemical cell 910. FIG. 9B shows an edge of the pouch material 918 partially folded, such that a first portion of the pouch material 918 forms an angle with a second portion of the pouch material. FIG. 9C shows the first portion of the pouch material 918 folded over and bonded to the second portion of the pouch material via an adhesive 925. FIG. 9D shows a detailed view of box D, as marked in FIG. 9C. As shown, the first portion of the pouch material 918 is folded over and bonded to the second portion of the pouch material 918 via the adhesive 925. In some embodiments, the pouch material 918 can be folded without the adhesive 925. In other words, the first portion of the pouch material 918 can be folded over the second portion of the pouch material 918 without being bonded thereto. Upon folding the edge of the pouch material 918, the pouch material 918 becomes stiffer and more robust than an unfolded edge of the pouch material 918. FIG. 9E shows multiple electrochemical cells 910 stacked to form the electrochemical cell module 900. The stiffness of the folded pouch material 918 can aid in maintaining the alignment of the electrochemical cells 910 when placed inside a casing (not shown). In some embodiments, the stack of electrochemical cells 910 can be placed in a casing all at once. In some embodiments, the electrochemical cells 910 can be placed in a casing one by one.

FIGS. 10A-10C are illustrations of a method of forming an electrochemical cell module 1000, according to an embodiment. As shown, the electrochemical cell module 1000 includes electrochemical cells 1010 with pouch material 1018. In some embodiments, the electrochemical cells 1010 and the pouch material 1018 can be the same or substantially similar to the electrochemical cells 918 and the pouch material 918, as described above with reference to FIGS. 9A-9E. Thus, certain aspects of the electrochemical cells 1010 and the pouch material 1018 are not described in greater detail herein.

FIG. 10A shows a stack of electrochemical cells 1010 with side panels 1067 on either side of the stack of electrochemical cells 1010. FIG. 10B shows the edges of the pouch material 1018 in a flattened state upon contact with the side panels 1067. FIG. 10C shows the stack of electrochemical cells 1010 encased by the side panels 1067, top panel 1068a, and bottom panel 1068b. As shown, the side panels 1067 contact the edges of the pouch material 1018 and flatten them to reduce the amount of empty space inside the electrochemical cell module 1000. As shown, the side panels 1067 have a curved shape. The curved shape of the side panels 1067 helps to corral the edges of the pouch material 1018 near the vertical center of the stack of electrochemical cells 1010 so that the edges of the pouch material 1018 are collected in a common area and do not bend in random directions. In some embodiments, the side panels 1067 can have a sharp V-shape to corral the edges of the pouch material 1018 together.

In some embodiments, the edges of the pouch material 1018 can be brought together prior to contact with the side panels 1067. In some embodiments, the edges of the pouch material 1018 can be brought together via the use of a removable tool that pushes the edges of the pouch material 1018 close to the vertical center of the stack of electrochemical cells 1010. This can aid in ensuring the edges of the pouch material 1018 are in an intended location when the side panels 1067 are installed.

FIG. 10C shows the top panel 1068a and the bottom panel 1068b being secured to the side panels 1067. In some embodiments, the top panel 1068a and the bottom panel 1068b can be secured to the side panels 1067 via a tape and/or an adhesive. In some embodiments, the top panel 1068a and the bottom panel 1068b can aid in keeping the side panels 1067 secured to the stack of electrochemical cells 1010. In some embodiments, an adhesive (not shown) can be used to secure the side panels 1067 to the edges of the pouch material 1018 without including the top panel 1068a or the bottom panel 1068b. In some embodiments, the stack of electrochemical cells 1010 and the side panels 1067 can be placed in a casing (not shown) to form the electrochemical cell module 1000. In some embodiments, the side panels 1067 can be incorporated into the casing.

Various concepts may be embodied as one or more methods, of which at least one example has been provided.

The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of" or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. An electrochemical cell module, comprising:
a first electrochemical cell, the first electrochemical cell comprising:
an anode material layer disposed on an anode current collector;
a cathode material layer disposed on a cathode current collector; and
a separator disposed between the anode material layer and the cathode material layer, the separator having sufficient size such that a portion of the separator extends beyond an outer edge of the anode material layer and an outer edge of the cathode material layer;
a pouch material encasing the first electrochemical cell, the pouch material having a greater width than a width of the separator and a greater length than a length of the separator such that a portion of the pouch material extends beyond outer bounds of the separator;
a second electrochemical cell;
a module case enclosing the first electrochemical cell and the second electrochemical cell; and
a heat sink disposed between the first electrochemical cell and the second electrochemical cell, the heat sink thermally coupled to the first electrochemical cell, the second electrochemical cell, and the module case and configured to transfer heat therebetween, the heat sink including a heating element configured to generate heat and transfer the generated heat to at least one of the first and second electrochemical cells or module case to modify a temperature in the electrochemical cell module,
wherein the portion of the pouch material that extends beyond the outer edge of the separator is folded at an angle of about 80 degrees to about 110 degrees with respect to a plane along which the anode material layer and the cathode material layer extend.

2. The electrochemical cell module of claim 1, wherein the heat sink extends beyond the outer edge of the anode material layer and the outer edge of the cathode material layer, and wherein the heat sink is folded such that a portion of the heat sink contacts an interior surface of the module case.

3. The electrochemical cell module of claim 1, further comprising:
a temperature sensor disposed between the first electrochemical cell and the second electrochemical cell.

4. The electrochemical cell module of claim 1, further comprising:
a frame member disposed around an outside edge of the first electrochemical cell.

5. The electrochemical cell module of claim 4, wherein the frame member includes a pass-through area for a portion of at least one of the anode current collector or the cathode current collector to pass through.

6. The electrochemical cell module of claim 4, further comprising:
a pressure member coupled to the frame member.

7. The electrochemical cell module of claim 4, wherein the portion of the separator that extends beyond the outer edge of the anode material layer and the outer edge of the cathode material layer and the portion of the pouch material that extends beyond the outer edge of the separator are coupled to the framing member.

8. The electrochemical cell module of claim 1, wherein the portion of the separator that extends beyond the outer edge of the anode material layer and the outer edge of the cathode material layer is folded at an angle of about 80 degrees to about 110 degrees with respect to the plane along which the anode material layer and the cathode material layer extend.

9. An electrochemical cell module, comprising:
   a first electrochemical cell, the first electrochemical cell comprising:
      an anode material layer disposed on an anode current collector;
      a cathode material layer disposed on a cathode current collector; and
      a separator disposed between the anode material layer and the cathode material layer, the separator having sufficient size such that a portion of the separator extends beyond an outer edge of the anode material layer and an outer edge of the cathode material layer, the separator having a top surface and a bottom surface;
   a pouch material encasing the first electrochemical cell, the pouch material having a greater width than a width of the separator and a greater length than a length of the separator such that a portion of the pouch material extends beyond outer bounds of the separator, the portion of the pouch material having a top surface and a bottom surface;
   a second electrochemical cell;
   a module case enclosing the first electrochemical cell and the second electrochemical cell, the module case including an inner wall; and
   a heat sink disposed between the first electrochemical cell and the second electrochemical cell, the heat sink thermally coupled to the first electrochemical cell, the second electrochemical cell, and the module case and configured to transfer heat therebetween, the heat sink including a heating element configured to generate heat and transfer the generated heat to at least one of the first and second electrochemical cells or the module case to modify a temperature in the electrochemical cell module,
   wherein at least one of the top surface or the bottom surface of the portion of the pouch material contacts the inner wall of the module case.

10. The electrochemical cell module of claim 9, wherein the portion of the separator that extends beyond the outer edge of the anode material layer and the outer edge of the cathode material layer is folded at an angle of about 80 degrees to about 110 degrees with respect to a plane along which the anode material layer and the cathode material layer extend.

11. The electrochemical cell module of claim 9, wherein the portion of the pouch material that extends beyond the outer edge of the separator is folded at an angle of about 80 degrees to about 110 degrees with respect to a plane along which the anode material layer and the cathode material layer extend.

12. The electrochemical cell module of claim 9, wherein the heat sink extends beyond the outer edge of a plane along which the anode material layer and the outer edge of the cathode material layer extend, and wherein the heat sink is folded such that a portion of the heat sink contacts the interior surface of the module case.

13. The electrochemical cell module of claim 9, further comprising:

a temperature sensor disposed between the first electrochemical cell and the second electrochemical cell.

14. The electrochemical cell module of claim 9, further comprising:
   a frame member disposed around an outside edge of the first electrochemical cell.

15. The electrochemical cell module of claim 14, wherein the frame member includes a pass-through area for a portion of at least one of the anode current collector or the cathode current collector to pass through.

16. The electrochemical cell module of claim 14, further comprising:
   a pressure member coupled to the frame member.

17. The electrochemical cell module of claim 9, wherein the module case includes a degassing aperture.

18. The electrochemical cell module of claim 9, wherein the portion of the pouch material is folded, such that a first section of the portion of the pouch material that extends beyond the outer bounds of the separator contacts a second section of the portion of the pouch material that extends beyond the outer bounds of the separator.

19. The electrochemical cell module of claim 18, wherein the first section is bonded to the second section via an adhesive.

20. The electrochemical cell module of claim 9, wherein the module case includes a side panel, the side panel including a curved surface.

21. An electrochemical cell module, comprising:
   a plurality of electrochemical cells arranged in a stack, each of the plurality of electrochemical cells each including:
      an anode material layer disposed on an anode current collector;
      a cathode material layer disposed on a cathode current collector; and
      a separator disposed between the anode material layer and the cathode material layer, the separator having sufficient size such that a portion of the separator extends beyond an outer edge of the anode material layer and an outer edge of the cathode material layer;
   a heat sink disposed between a first electrochemical cell of the plurality of electrochemical cells and a second electrochemical cell of the plurality of electrochemical cells, the heat sink thermally coupled to the first electrochemical cell and the second electrochemical cell and configured to transfer heat therebetween, the heat sink including a heating element configured to generate heat and transfer the generated heat to at least one of the first electrochemical cell or the second electrochemical cell to modify a temperature in the electrochemical cell module; and
      a pouch material having a greater width than a width of the separator and a greater length than a length of the separator such that a portion of the pouch material extends beyond outer bounds of the separator,
   wherein the portion of each pouch material that extends beyond the outer bounds of the separator has a first side and a second side opposite the first side, the first side folded relative to a plane along which the anode material layer and the cathode material layer extend, the second side folded relative to the plane along which the anode material layer and the cathode material layer extend and at an angle of between about 160 degrees and about 200 degrees relative to the first side.

22. The electrochemical cell module of claim 21, wherein the portion of the pouch material that extends beyond the outer edge of the separator is folded at an angle of about 80 degrees to about 110 degrees with respect to the plane along which the anode material layer and the cathode material layer extend.

23. The electrochemical cell module of claim 21, further comprising:

a frame disposed between the first electrochemical cell and an inner surface of a module case, the frame disposed around an outer edge of the first electrochemical cell, wherein the portion of the pouch material that extends beyond the outer edge of the separator and a portion of the heat sink that extends beyond an outer periphery of the frame are folded at an angle of about 80 degrees to about 110 degrees with respect to a lateral dimension of the anode material layer or the cathode material layer such that the folded portion of the heat sink is interposed between the outer periphery of the frame and an inner surface of the module case and thermally coupled to the internal surface of the module case.

* * * * *